(12) United States Patent
Xiao

(10) Patent No.: US 7,010,429 B2
(45) Date of Patent: Mar. 7, 2006

(54) INDUCTION LOGGING SYSTEM AND METHOD FEATURING MULTI-FREQUENCY SKIN EFFECT CORRECTION

(75) Inventor: Jiaqi Xiao, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 293 days.

(21) Appl. No.: 10/646,932

(22) Filed: Aug. 22, 2003

(65) Prior Publication Data
US 2005/0040828 A1    Feb. 24, 2005

(51) Int. Cl.
G01V 3/18    (2006.01)

(52) U.S. Cl. ............................................. 702/7

(58) Field of Classification Search ............. 702/7; 324/338, 339, 343
See application file for complete search history.

(56) References Cited

U.S. PATENT DOCUMENTS

| | | | |
|---|---|---|---|
| 3,147,429 A | 9/1964 | Moran | 324/339 |
| 4,471,436 A | 9/1984 | Schaefer et al. | 702/7 |
| 5,146,167 A | 9/1992 | Strickland et al. | 324/339 |
| 5,666,057 A | 9/1997 | Beard et al. | 324/339 |
| 5,698,982 A | 12/1997 | Mitchell | 324/339 |
| 6,597,993 B1 * | 7/2003 | Strickland et al. | 702/7 |

OTHER PUBLICATIONS

Liu, et al., "A New Method To Correct The Effect of Skin-Effect In Induction Logs," SPWLA 41st Annual Logging Symposium, Paper D, pp 1-9, Jun. 4-7, 2000.

* cited by examiner

Primary Examiner—Donald McElheny, Jr.
(74) Attorney, Agent, or Firm—Baker Botts L.L.P.

(57) ABSTRACT

A system and method of correcting skin effect of conductivity measurements made by electromagnetic induction well logging instruments. A limited number of measurements using different frequencies may be used. The skin effect correction system and method is capable of processing a complex signal waveform but only requires the in-phase signal measurements which are then corrected for the skin effect value and the geometric factors of the apparent conductivity measurements, thus making the corrected measurements suitable for advanced processing with modern array-type induction logging tools.

50 Claims, 17 Drawing Sheets

INDUCTION LOGGING SYSTEM AND METHOD FEATURING MULTI-FREQUENCY SKIN EFFECT CORRECTION

FIELD OF THE INVENTION

The present invention relates generally to electromagnetic induction well logging instruments, and more particularly to a system and method of correcting skin effect of conductivity measurements made by the electromagnetic induction well logging instruments.

BACKGROUND OF THE INVENTION TECHNOLOGY

Electromagnetic induction logging instruments are used in the oil and gas industry to measure conductivity of geological formations penetrated by wellbores. A wellbore includes the openhole or uncased portion of an oil or gas well. A borehole may refer to the inside diameter of the wellbore wall, the rock face that bounds the drilled hole. The electromagnetic induction logging technology was first introduced in 1949, and more fully described by Henri G. Doll, "Introduction to Induction Logging and Application to Logging of Wells Drilled with Oil Based Mud," Journal of Petroleum Technology, Vol. 1, No. 6, June 1949, pp. 148–162.

In induction well logging, a coil system is lowered into a wellbore for the purpose of investigating the electrical properties of earth formations adjacent the wellbore. An electrical property of interest in such investigation is the electrical conductivity of particular portions of the formation.

Electromagnetic induction logging instruments, or tools, typically consist of at least one transmitting coil and at least one receiving coil. An alternating current having at least one frequency is conducted through the transmitting coil(s). The alternating current induces eddy currents to flow within the surrounding geological formations. The eddy current in turn induces voltages in the receiving coil(s). The voltages induced in the receiving coil(s) are converted to apparent conductivities through a linear relationship derived under the assumption of a vanishingly small value of conductivity. This assumption is commonly referred to as "the Doll limit." When the formation conductivity value is not vanishingly small, the voltages induced in the receiver coil(s) relate non-linearly to the formation conductivity. The difference between the derived linear relationship and the actual non-linear formation conductivity is generically referred to as the "skin effect." There are two important aspects of this skin effect. First, the skin effect makes the apparent conductivity value smaller than its true value. Second, the skin effect makes the response functions or geometric factors different from the ones derived under the Doll limit, thus causing severe non-linearity of the measured values.

Induction logging measurements are affected by skin effect in the aspects of apparent conductivity value and in the aspect of response functions or geometric factors as well, causing severe non-linearity. Traditional skin effect correction methods only boost the apparent conductivity and are no longer suited for modern induction tools, such as array induction tools, which rely on linear numerical processing to obtain desired induction logs. The skin effect correction method with quadrature (x-signal) measurements is widely used at present. However, the quadrature signal component is prone to various noise, error, instability, etc., from the direct coupling through the geological formation. In order to minimize interference during quadrature signal measurements, a metal mandrel is generally required in modern induction tools to provide adequate electromagnetic shielding between the transmitter coil lead wires and the receiver coils and receiver coil lead wires. A metal mandrel blocks the induction signal all through its cross section, thus for adequate signal level, the induction tool must have a large diameter, making it almost impossible to design a slim-hole array induction tool.

Over the years, several different methods were developed to correct for the skin effect. The traditional method, used with the induction tools that measure only the in-phase part of the induced voltage with a single frequency, boosts the apparent conductivity by empirical sequence or formulas. This traditional method is in principle only a stopgap to the skin effect, because it only addresses the first aspect of the skin effect. A similar method is also published by Liu et al. in paper "A New Method to Correct the Effect of Skin-Effect in Induction Logs," SPWLA 41$^{st}$ Annual Logging Symposium, Jun. 4–7, 2000, paper D.

U.S. Pat. No. 3,147,429, by Moran (Moran '429), describes a skin effect correction method of combining the in-phase signal component and the out-of-phase (in quadrature) signal component. This method addresses both aspects of the skin effect. However, the measurement of the quadrature signal component often suffers from relatively small signal levels (when the formation is resistive), sonde error instability, severe temperature effects and distortion from magnetic materials in the drilling fluid. The aforementioned drawbacks of measuring the quadrature signal component eventually limit the skin effect correction. U.S. Pat. No. 4,471,436, by Schaefer et al., and U.S. Pat. No. 5,698,982, by Mitchell describe different implementations of the method described in the aforementioned Moran '429.

To avoid having to use the quadrature signal component, two methods were developed in the past as described in U.S. Pat. No. 5,146,167, by Strickland et al. (Strickland '167), and U.S. Pat. No. 5,666,057, by Beard et al. (Beard '057). Strickland '167 describes a skin effect correction method that uses only the in-phase signal component. By filtering the cubed square root of the in-phase signal component, this method corrects for distortion of the vertical geometric factors while restoring the conductivity value. But, it leaves the radial geometric factor uncorrected. The method described in Beard '057 first determines a best fit curve of the in-phase measurements with respect to the frequency and then extracts the first derivative and the second derivative of the best fit curve with respect to the frequency. The first and second derivatives are then used to extrapolate the curve of the in-phase measurement with respect to a zero frequency. The skin effect corrected conductivity is the conductivity that would be obtained when the frequency is equal to zero. To apply the method of Beard '057, a set of in-phase measurements must be made at multiple frequencies to form a simple spectrum with respect to frequency, which increases the cost of the induction logging.

SUMMARY OF THE INVENTION

The invention overcomes the above-identified problems as well as other shortcomings and deficiencies of existing technologies by providing for correction of skin effect error in a conductivity measurement and in the geometric factors of the induction measurements in induction logging. The present invention obtains its measurements with a limited number (e.g., two or three) of measurements using different frequencies. The skin effect correction method, according to the present invention, takes the signal measurements and corrects for the skin effect of the apparent conductivity value and geometric factors, while at the same time being adequate for processing of data from modern array-type induction logging tools. The method, according to the present invention, provides a more efficient way to investigate formation conductivity. In addition, the present invention provides an adaptive way to control possible noise during measurement of the formation. Only the in-phase component of the measurement signal is necessary, however, the invention may be used with any type of complex signal waveform.

The present invention provides a reliable way to correct induction logs for the skin effect in order to apply advanced processing schemes to the logs, such as software focusing. Since only the in-phase component of a signal is required during measurement, the present invention does not need quadrature signal (X-signal) measurements, thus saving cost and effort in developing an induction tool.

The present invention is directed to a method for correcting skin effect in a induction logging system, said method comprising the steps of: measuring at least two apparent conductivities at two or more operating frequencies; determining weighting coefficients; determining weights; determining a low-pass filtered conductivity difference between the at least two apparent conductivities; determining at least two corrected conductivities from the measured at least two apparent conductivities, the weighting coefficients, the weights, the low-pass filtered conductivity difference and the two or more operating frequencies; determining at least two compensated conductivities from the at least two corrected conductivities and a look-up table; determining selection coefficients; and determining a formation corrected conductivity from the at least two compensated conductivities and the selection coefficients.

The present invention is also directed to a method for correcting skin effect in a induction logging system, said method comprising the steps of: measuring first and second apparent conductivities at first and second operating frequencies, respectively; determining first and second weighting coefficients; determining first and second weights; determining a low-pass filtered conductivity difference between the measured first and second apparent conductivities; determining a first corrected conductivity from the measured first and second apparent conductivities, the first and second weighting coefficients, and the first weight; determining a second corrected conductivity from the first corrected conductivity, the second weight, the low-pass filtered conductivity difference, and the first and second operating frequencies; determining first and second compensated conductivities from the first and second corrected conductivities, respectively, and a look-up table; determining selection coefficients; and determining a formation corrected conductivity by summing the selection coefficients combined with the first and second compensated conductivities.

The present invention is also directed to a method for correcting skin effect in a induction logging system, said method comprising the steps of: measuring first, second and third apparent conductivities at first, second and third operating frequencies, respectively; determining first, second and third weighting coefficients; determining first, second and third weights; determining a first low-pass filtered conductivity difference between the measured first and second apparent conductivities; determining a second low-pass filtered conductivity difference between the measured second and third apparent conductivities; determining a third low-pass filtered conductivity difference between the measured first and third apparent conductivities; determining a first corrected conductivity from the measured first, second and third apparent conductivities, the first, second and third weighting coefficients, and the first weight; determining a second corrected conductivity from the first corrected conductivity, the second weight, the third low-pass filtered conductivity difference, and the first and third operating frequencies; determining a third corrected conductivity from the second corrected conductivity, the first low-pass filtered conductivity difference, the second low-pass filtered conductivity difference, the first, second and third operating frequencies, and the third weight; determining first, second and third compensated conductivities from the first, second and third corrected conductivities, respectively, and values from a look-up table; determining selection coefficients; and determining a formation corrected conductivity by summing the selection coefficients combined with the first, second and third compensated conductivities.

The present invention is also directed to an induction logging system having skin effect correction, said system comprising: an induction logging tool for measuring at least two apparent conductivities at two or more operating frequencies; a processor, wherein the processor receives the measured at least two apparent conductivities from the induction logging tool; the processor determines weighting coefficients; the processor determines weights; the processor determines a low-pass filtered conductivity difference between at least two apparent conductivities; the processor determines at least two corrected conductivity from the measured at least two apparent conductivities, the weighting coefficients, the weights, the low-pass filtered conductivity difference and the two or more operating frequencies; the processor determines at least two compensated conductivities from the at least two corrected conductivities and a look-up table; the processor determines selection coefficients; and the processor determines a formation corrected conductivity from the at least two compensated conductivities and the selection coefficients.

The present invention is also directed to an induction logging system having skin effect correction, said system comprising: an induction logging tool for measuring first, second and third apparent conductivities at first, second and third operating frequencies, respectively; a processor, wherein the processor receives the measured first, second and third apparent conductivities from the induction logging tool; the processor determines first, second and third weighting coefficients; the processor determines first, second and third weights; the processor determines a first low-pass filtered conductivity difference between the measured first and second apparent conductivities; the processor determines a second low-pass filtered conductivity difference between the measured second and third apparent conductivities; the processor determines a third low-pass filtered conductivity difference between the measured first and third apparent conductivities; the processor determines a first corrected conductivity from the measured first, second and third apparent conductivities, the first, second and third weighting coefficients, and the first weight; the processor determines a second corrected conductivity from the first corrected conductivity, the second weight, the third low-pass filtered conductivity difference, and the first and third operating frequencies; the processor determines a third corrected conductivity from the second corrected conductivity, the first low-pass filtered conductivity difference, the second low-pass filtered conductivity difference, the first, second and third operating frequencies, and the third weight; the processor determines first, second and third compensated conductivities from the first, second and third corrected conductivities, respectively, and values from a look-up table; the processor determines selection coefficients; and the processor determines a formation corrected conductivity by summing the selection coefficients combined with the first, second and third compensated conductivities.

Other features and advantages of the invention will be apparent from the following description of the embodiments, given for the purpose of disclosure and taken in conjunction with the accompanying drawing.

BRIEF DESCRIPTION OF THE DRAWINGS

A more complete understanding of the present disclosure and advantages thereof may be acquired by referring to the following description taken in conjunction with the accompanying drawing, wherein.

Figure 1:
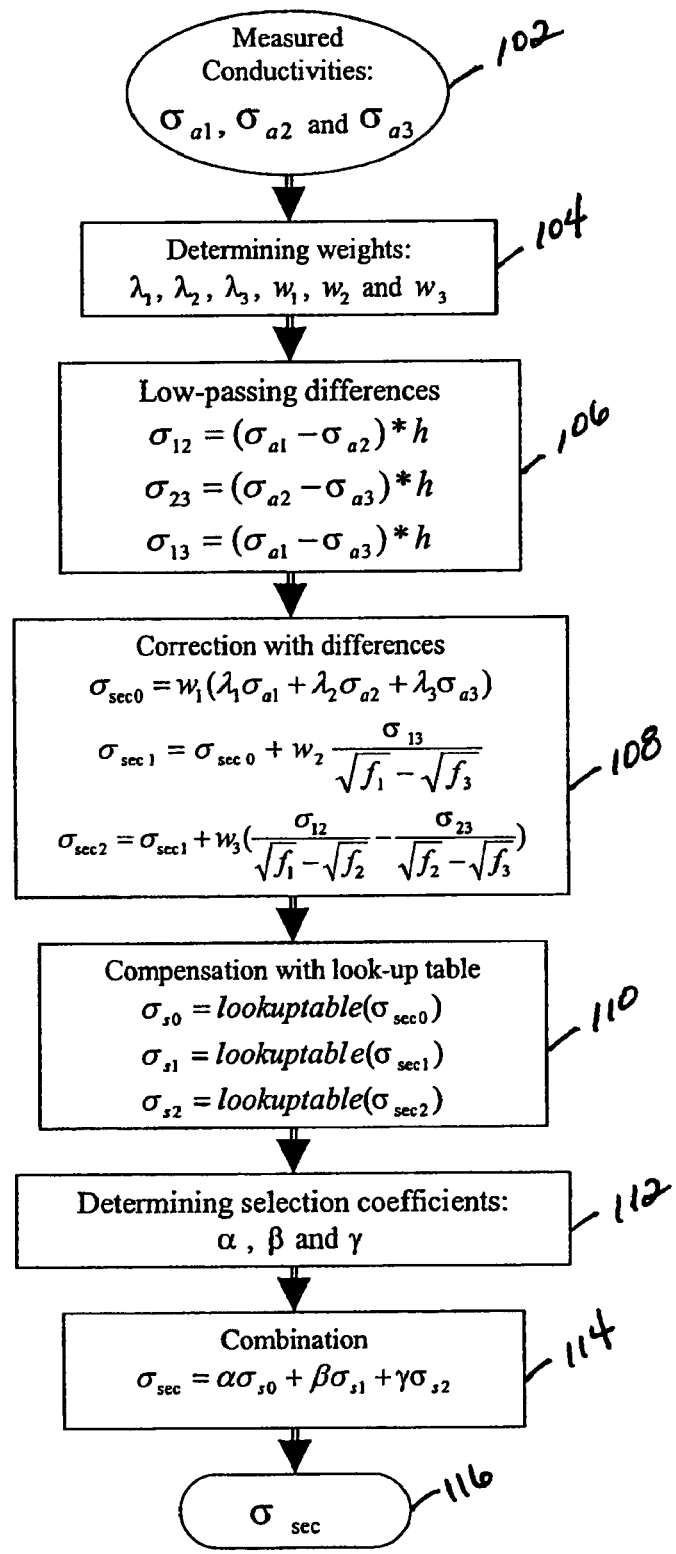
FIG. 1 illustrates a process flow diagram for determining a formation corrected conductivity from three apparent conductivities taken at three different operating frequencies, according to an exemplary embodiment of the present invention.

While the present invention is susceptible to various modifications and alternative forms, specific exemplary embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Referring now to the drawings, the details of exemplary embodiments of the present invention are schematically illustrated. Like elements in the drawing will be represented by like numbers, and similar elements will be represented by like numbers with a different lower case letter suffix.

Figure 15:
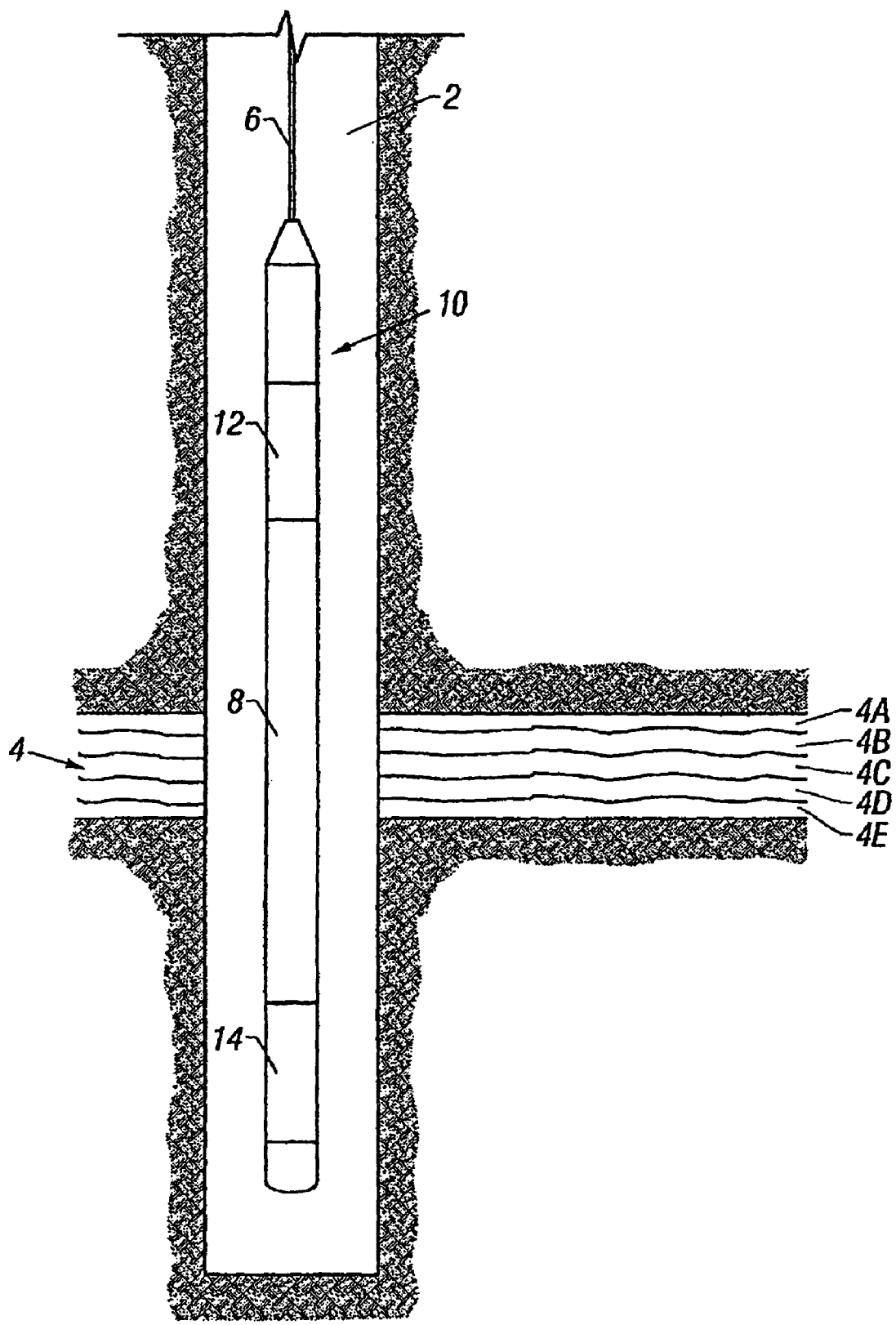
FIG. 15 illustrates an electromagnetic induction well logging instrument disposed in a wellbore penetrating earth formations.

Referring now to FIG. 15, depicted is an electromagnetic induction well logging instrument, generally represented by the numeral 10, is disposed in a wellbore 2 penetrating earth formations 4. The electromagnetic induction well logging instrument 10 is shown disposed in the wellbore 2 drilled through the penetrating earth formations 4. The electromagnetic induction well logging instrument 10 may be lowered into and withdrawn from the wellbore 2 by means of an armored electrical cable 6 or similar conveyance known in the art. The electromagnetic induction well logging instrument 10 may be, for example, assembled from three subsections: an auxiliary electronics unit 14 disposed at one end of the instrument 10; a coil mandrel unit 8 attached to the auxiliary electronics unit 14; and a receiver/signal processing/telemetry electronics unit 12 attached to the other end of the coil mandrel unit 8, the auxiliary electronics unit 12 typically being attached to the cable 6. The coil mandrel unit 8 includes induction transmitter and receiver coils, as will be further explained, for inducing electromagnetic fields in the earth formations 4 and for receiving voltage signals induced by eddy currents flowing in the earth formations 4 as a result of the electromagnetic fields induced therein. Any number of coil pairs (transmitter/receiver) may be used with the present invention.

The auxiliary electronics unit 14 can include a signal generator and power amplifiers (not shown) to cause alternating currents of selected frequencies to flow through transmitter coils in the coil mandrel unit 8. The receiver/signal processing/telemetry electronics unit 12 can include receiver circuits (not shown) for detecting voltages induced in receiver coils in the coil mandrel unit 8, and circuits for processing these received voltages (not shown) into signals representative of the conductivities of various layers, shown as 4A through 4E of the earth formations 4. As a matter of convenience the receiver/signal processing/telemetry electronics unit 12 can include signal telemetry to transmit the conductivity-related signals to the earth's surface along the cable 6 for further processing, or alternatively can store the conductivity related signals in an appropriate recording device (not shown) for processing after the electromagnetic induction well logging instrument 10 is withdrawn from the wellbore 2.

In a homogeneous formation of conductivity ($\sigma$), the apparent conductivity ($\sigma_a$) of the component of a two-coil elementary induction sensor at a frequency (f) may be expressed as:

$$\sigma_a = \sigma - \frac{2}{3}x\sigma + \frac{2}{15}x^3\sigma - \frac{1}{18}x^4\sigma + \frac{1}{105}x^5\sigma + \ldots \quad (1)$$

Where:

$$x = L\sqrt{\pi\mu\sigma f}$$

L is the spacing between the transmitting coil and the receiving coil in meters, f is the operating frequency in Hz and $\mu$ is the magnetic permeability of the formation. The first term is the true conductivity. The other terms nonlinearly relate to the true conductivity. So, the total of the terms but the first one is of the skin effect. For induction logging instruments x satisfies x<<1.

Therefore, the amplitude of the terms on the right side of Equation (1) above progressively decreases. If we just want to solve for the true conductivity ($\sigma$) in a homogeneous formation, there would be many different ways to do so. For modern induction tools that rely heavily on numerical processing to produce final induction logs, it is important that a correction be made to remove the skin effect on the geometric factors as well as on the apparent conductivity value.

From Equation (1) above, the present invention makes use of the first and second differences of the apparent conductivity with respect to the square root of the operating frequency. The skin effect correction method, according to the present invention, corrects for the skin effect of the apparent conductivity value and at the same time restores the geometric factor as much as possible. In addition, noise control is available through all of the solution process steps.

With three apparent conductivity measurements ($\sigma_{a1}$, $\sigma_{a2}$ and $\sigma_{a3}$) taken at three operating frequencies $f_1$, $f_2$ and $f_3$, the following equations may be formulated:

$$\sigma_{sec0} = w_1(\lambda_1 \sigma_{a1} + \lambda_2 \sigma_{a2} + \lambda_3 \sigma_{a3}); \tag{2A}$$

$$\sigma_{sec1} = \sigma_{sec0} + w_2\left(\frac{\sigma_{a1} - \sigma_{a3}}{\sqrt{f_1} - \sqrt{f_3}}\right) * h; \tag{2B}$$

$$\sigma_{sec2} = \sigma_{sec1} + w_3\left(\frac{\sigma_{a1} - \sigma_{a2}}{\sqrt{f_1} - \sqrt{f_2}} - \frac{\sigma_{a2} - \sigma_{a3}}{\sqrt{f_1} - \sqrt{f_3}}\right) * h. \tag{2C}$$

Where, $\lambda_1$, $\lambda_2$ and $\lambda_3$ are weighting coefficients, which are adaptively adjusted on the basis of an estimated conductivity level, the transmitter-receiver coil spacing, and the operating frequency. More specifically, the adaptive adjustment is based on the uncertainty of each measurement. Where h is a low-pass filter having two functions: The first function controls possible random noise and the second function filters the response function of the first and second differences with respect to the square root of the frequency, so that they match the geometric factor of the skin effect. In order for ($\sigma_{sec0}$, $\sigma_{sec1}$ and $\sigma_{sec2}$ in Equation (2) to be as close to the true conductivity ($\sigma$) as possible in a homogeneous formation, the weights ($w_1$, $w_2$ and $w_3$) satisfy the following equations:

$$w_1 = \frac{1}{\lambda_1 + \lambda_2 + \lambda_3} \tag{3A}$$

$$w_2 = \frac{\lambda_1 \sqrt{f_1} + \lambda_2 \sqrt{f_2} + \lambda_2 \sqrt{f_3}}{\lambda_1 + \lambda_2 + \lambda_3} \tag{3B}$$

$$w_3 = \frac{\sqrt{f_1}(\sqrt{f_1} + \sqrt{f_3})(\lambda_1 \sqrt{f_3} + \lambda_2 \sqrt{f_2} + \lambda_3 \sqrt{f_3}) - \lambda_2 \sqrt{f_2}(f_2 - f_3)}{(\lambda_1 + \lambda_2 + \lambda_3)(\sqrt{f_1} + \sqrt{f_2} + \sqrt{f_3})(\sqrt{f_1} - \sqrt{f_3})} \tag{3C}$$

Substituting Equations (2) and (3) into Equation (1), we obtain the following relationship between the true conductivity $\sigma$ and $\sigma_{sec0}$, $\sigma_{sec1}$ and $\sigma_{sec2}$ $$\sigma_{sec0} = \sigma + O(x). \tag{4A}$$

$$\sigma_{sec1} = \sigma + O(x^3). \tag{4B}$$

$$\sigma_{sec2} = \sigma + O(x^4). \tag{4C}$$

Where, O denotes residual skin effect. To farther correct for the residual skin effect, look-up tables are used on the basis of homogeneous formation model See FIG. 16 and the accompanying description herein for creating an exemplary look-up table.

The skin effect is a function of three factors: the formation conductivity ($\sigma$), the operating frequency (f) and the transmitter-receiver coil spacing (L). $\sigma_{sec0}$ is a simple weighted average of the three measurements. It holds valid for cases of very low conductivity or very small transmitter-receiver coil spacing, or for both. While, $\sigma_{sec2}$ counts both the first difference and the second difference, theoretically, $\sigma_{sec2}$ is the one with more skin effect removed than $\sigma_{sec0}$. In reality, however, the first and second differences carry a certain amount of possible error with them. When the skin effect is very small, $\sigma_{sec0}$ is more reliable than $\sigma_{sec2}$ or $\sigma_{sec1}$.

The following equation handles the tradeoff adaptively:

$$\sigma_{sec} = \alpha \sigma_{s0} + \beta \sigma_{s1} + \gamma \sigma_{s2}. \tag{4}$$

Where, $\alpha$, $\beta$ and $\gamma$ are named selection coefficients associated with $\sigma_{s0}$, $\sigma_{s1}$ and $\sigma_{s2}$, respectively, and relate to $\sigma_{sec0}$, $\sigma_{sec1}$ and $\sigma_{sec2}$ through the look-up table, or, $$\sigma_{s0} = \text{lookuptable}(\sigma_{sec0}). \tag{5A}$$

$$\sigma_{s1} = \text{lookuptable}(\sigma_{sec1}). \tag{5B}$$

$$\sigma_{s2} = \text{lookuptable}(\sigma_{sec2}). \tag{5A}$$

The sum of the three selection coefficients, $\alpha$, $\beta$ and $\gamma$, equals one. The determination of these coefficients is based on the uncertainty of the first and the second differences of the measurements.

According to the present invention, three operating frequencies are preferable, however, using only two operating frequencies ($f_1$ and $f_2$) are also effective and within the scope of the present invention. Equations (2), (3), (4) and (5) may be simplified to the following forms.

$$\sigma_{sec0} = w_1(\lambda_1 \sigma_{a1} + \lambda_2 \sigma_{a2}) \tag{6A}$$

$$\sigma_{sec1} = \sigma_{sec0} + w_2\left(\frac{\sigma_{a1} - \sigma_{a2}}{\sqrt{f_1} - \sqrt{f_2}}\right) * h \tag{6B}$$

$$w_1 = \frac{1}{\lambda_1 + \lambda_2} \tag{7A}$$

$$w_2 = \frac{\lambda_1 \sqrt{f_1} + \lambda_2 \sqrt{f_2}}{\lambda_1 + \lambda_2} \tag{7B}$$

$$\sigma_{sec} = \alpha \sigma_{s0} + \beta \sigma_{s1} \tag{8}$$

$$\sigma_{s0} = \text{lookuptable}(\sigma_{sec0}) \tag{9A}$$

$$\sigma_{s1} = \text{lookuptable}(\sigma_{sec1}) \tag{9B}$$

As an example of an exemplary embodiment of the present invention, a hypothetical array induction tool may be comprised of six arrays and may operate at three different frequencies, e.g., 12 kHz, 36 kHz and 72 kHz. The transmitter-receiver coil spacing of the six arrays may be, for example but not limited to, 6 inches, 10 inches, 20 inches, 30 inches, 50 inches and 80 inches, respectively.

It is contemplated and within the scope of the present invention that two or more different frequencies may be used in combination with one or more pair of transmitter-receiver coils. The frequencies used for the present invention may be from about 5 kilohertz to about 500 kilohertz. The distance between each of the transmitter and receiver coil pairs may be from about 5 inches to about 150 inches. Any number of transmitter and receiver coil pairs may be used and the distances therebetween varied, according to the present invention.

Referring now to FIG. 1, depicted is a process flow diagram for determining a formation corrected conductivity from three apparent conductivities taken at three different operating frequencies. In step 102, first, second and third apparent conductivities ($\sigma_{a1}$, $\sigma_{a2}$ and $\sigma_{a3}$) are measured at first, second and third operating frequencies ($f_1$, $f_2$ and $f_3$), respectively. In step 104, first, second and third weighting coefficients ($\lambda_1$, $\lambda_2$ and $\lambda_3$), and first, second and third weights ($w_1$, $w_2$ and $w_3$) are determined. Step 106 determines a first low-pass filtered conductivity difference, $\sigma_{12}$, between the measured first and second apparent conductivities ($\sigma_{a1}-\sigma_{a2}$) and the low-pass filter, h. Step 106 also determines a second low-pass filtered conductivity difference, $\sigma_{22}$, between the measured second and third apparent conductivities ($\sigma_{a1}-\sigma_{a2}$) and the low-pass filter, h. Step 106 further determines a third low-pass filtered conductivity difference, $\sigma_{13}$, between the measured first and third apparent conductivities ($\sigma_{a1}-\sigma_{a3}$) and the low-pass filter, h.

In step 108, a first corrected conductivity ($\sigma_{sec0}$) is determined, as indicated, from the measured first, second and third apparent conductivities ($\sigma_{a1}$, $\sigma_{a2}$ and $\sigma_{a3}$), the first, second and third weighting coefficients ($\lambda_1$, $\lambda_2$ and $\lambda_3$), and the first weight ($w_1$). Also in step 108 a second corrected conductivity ($\sigma_{sec1}$) is determined, as indicated, from the first corrected conductivity ($\sigma_{sec0}$), the second weight ($w_2$), the third low-pass filtered conductivity difference ($\sigma_{13}$), and the first and third operating frequencies ($f_1$ and $f_3$). Furthermore, in step 108, a third corrected conductivity ($\sigma_{sec2}$) is determined, as indicated, from the second corrected conductivity ($\sigma_{sec1}$), the first low-pass filtered conductivity difference ($\sigma_{12}$), the second low-pass filtered conductivity difference ($\sigma_{23}$), the first, second and third operating frequencies ($f_1$, $f_2$ and $f_3$), and the third weight ($w_3$). In step 110; first, second and third compensated conductivities ($\sigma_{s0}$, $\sigma_{s1}$ and $\sigma_{s2}$) are determined from the first, second and third corrected conductivities ($\sigma_{sec0}$, $\sigma_{sec1}$ and $\sigma_{sec2}$), respectively, and values from a look-up table described herein.

In step 112, selection coefficients ($\alpha$, $\beta$ and $\gamma$) are determined. See FIG. 17 and the description herein. The sum of the selection coefficients ($\alpha+\beta+\gamma$) is substantially equal to one (1). In step 114; the selection coefficients ($\alpha$, $\beta$ and $\gamma$) are combined, as indicated, with the first, second and third compensated conductivities ($\sigma_{s0}$, $\sigma_{s1}$ and $\sigma_{s2}$) and then these combinations are summed, as indicated, to determine the formation corrected conductivity, $\sigma_{sec}$, as represented in step 116.

Figure 2:
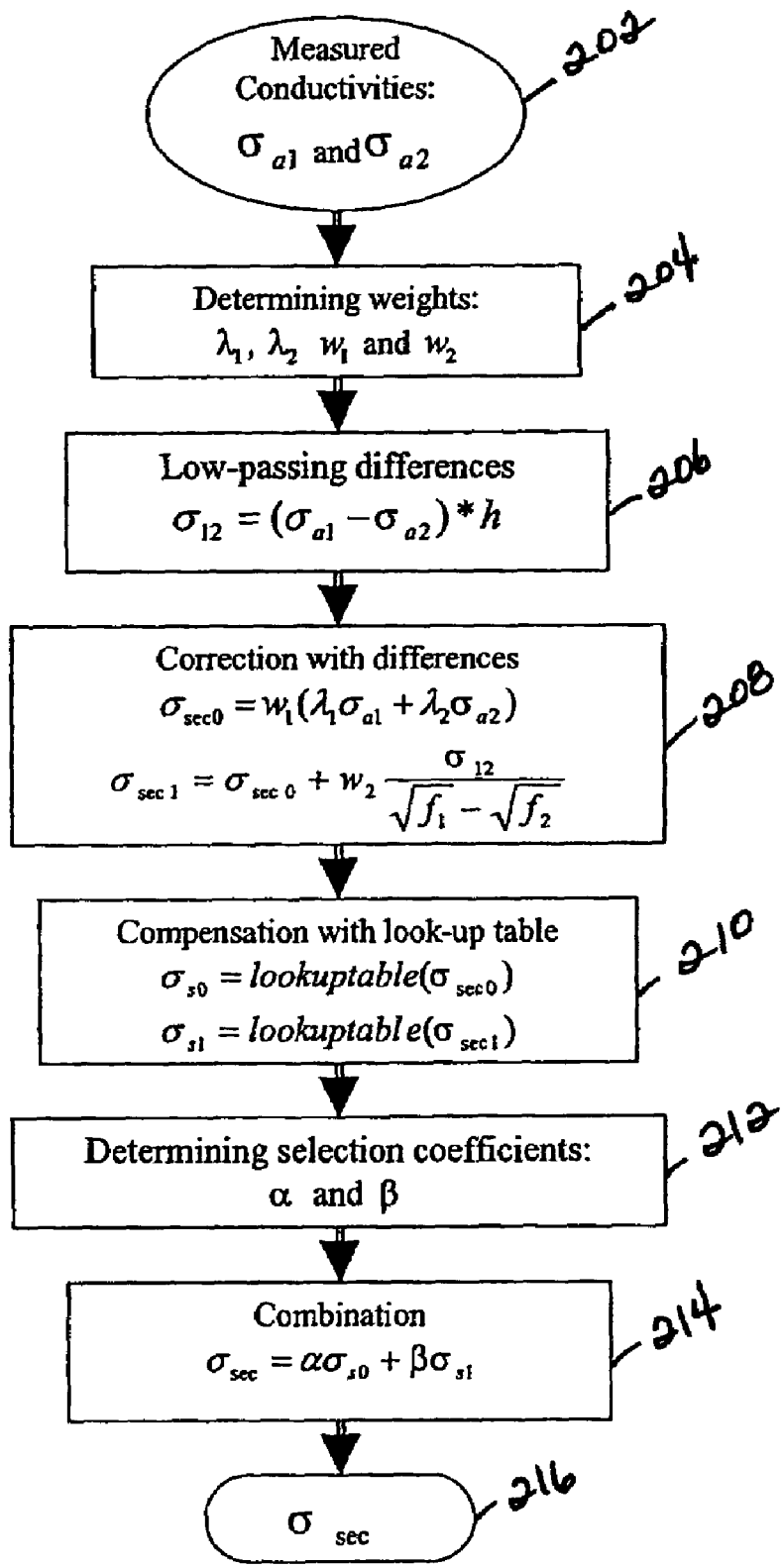
FIG. 2 illustrates a process flow diagram for determining a formation corrected conductivity from two apparent conductivities taken at two different operating frequencies, according to another exemplary embodiment of the present invention.

Referring now to FIG. 2, depicted a process flow diagram for determining a formation corrected conductivity from two apparent conductivities taken at two different operating frequencies, according to another exemplary embodiment of the present invention. In step 202, first and second apparent conductivities ($\sigma_{a1}$ and $\sigma_{a2}$) are measured at first and second operating frequencies ($f_1$ and $f_2$), respectively. In step 204, first and second weighting coefficients ($\lambda_1$ and $\lambda_2$), and first and second weights ($w_1$ and $w_2$) are determined. Step 206 determines a low-pass filtered conductivity difference, $\sigma_{12}$, between the measured first and second apparent conductivities ($\sigma_{a1}-\sigma_{a2}$) and the low-pass filter, h.

In step 208, a first corrected conductivity ($\sigma_{sec0}$) is determined, as indicated, from the measured first and second apparent conductivities ($\sigma_{a1}$ and $\sigma_{a2}$), the first and second weighting coefficients ($\lambda_1$ and $\lambda_2$), and the first weight ($w_1$). Also in step 208 a second corrected conductivity ($\sigma_{sec1}$) is determined, as indicated, from the first corrected conductivity ($\sigma_{sec0}$), the second weight ($w_2$), the low-pass filtered conductivity difference ($\sigma_{12}$), and the first and second operating frequencies ($f_1$ and $f_2$). In step 210; first and second compensated conductivities ($\sigma_{s0}$ and $\sigma_{s1}$) are determined from the first and second corrected conductivities ($\sigma_{sec0}$ and $\sigma_{sec1}$), respectively, and values from a look-up table.

In step 212, selection coefficients $\alpha$ and $\beta$ are determined. The sum of the selection coefficients ($\alpha+\beta$) is substantially equal to one (1). In step 214; the selection coefficients ($\alpha$ and $\beta$) are combined, as indicated, with the first and second compensated conductivities ($\sigma_{s0}$ and $\sigma_{s1}$) and then these combinations are summed, as indicated, to determine the formation corrected conductivity, $\sigma_{sec}$, as represented in step 216.

In the following graphs depicted in FIGS. 3–8, the apparent conductivity (mS/m) is shown on the vertical axis and the true conductivity (mS/m) is shown on the horizontal axis.

Figure 3:
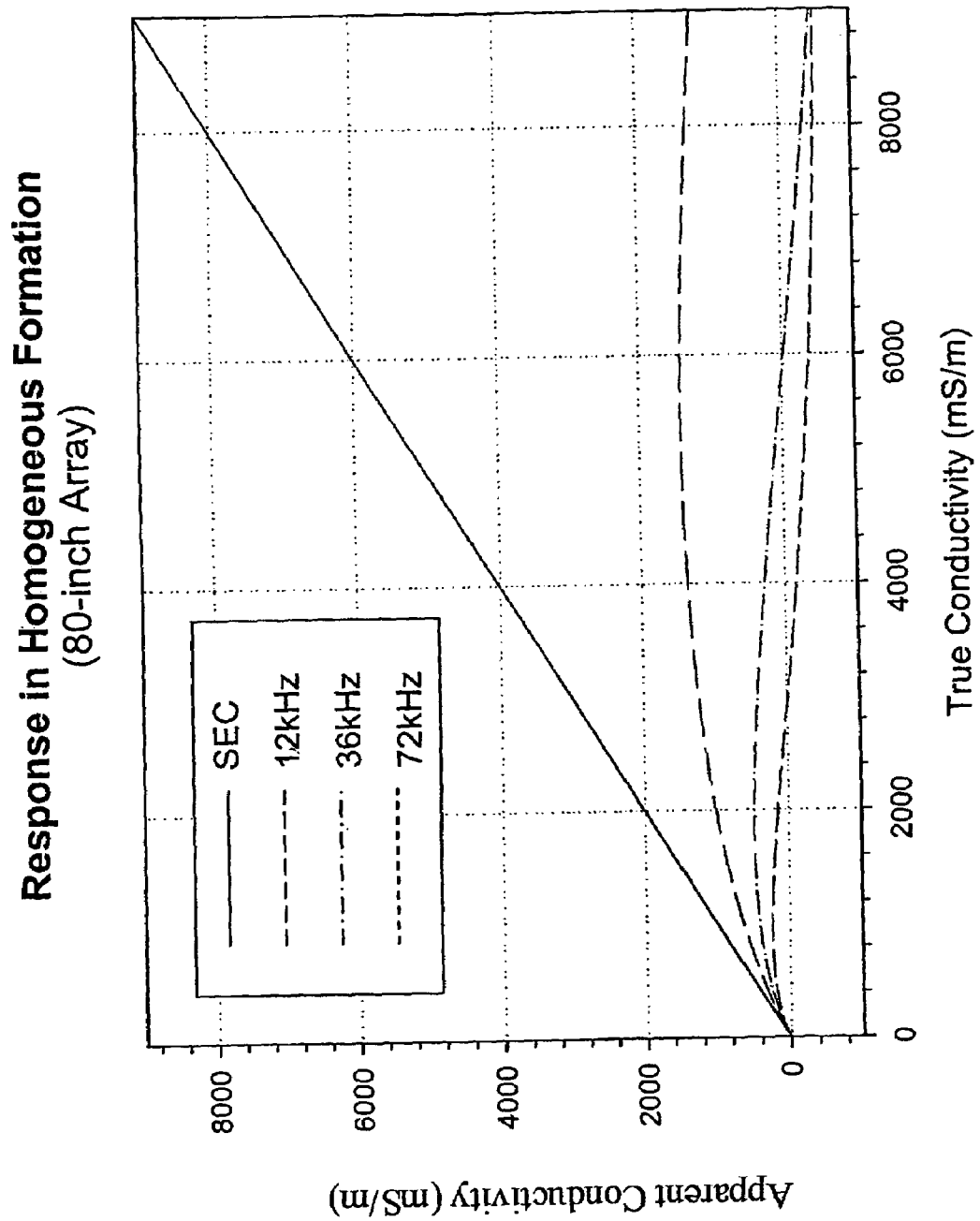
FIG. 3 illustrates responses at three frequencies of an 80-inch array in homogeneous formations that show how the skin effect varies with operating frequency.

FIG. 3 depicts the responses at three different operating frequencies (12 kHz, 36 kHz and 72 kHz) of an 80-inch array in a homogeneous formation that show how the skin effect varies with the operating frequency.

Figure 4:
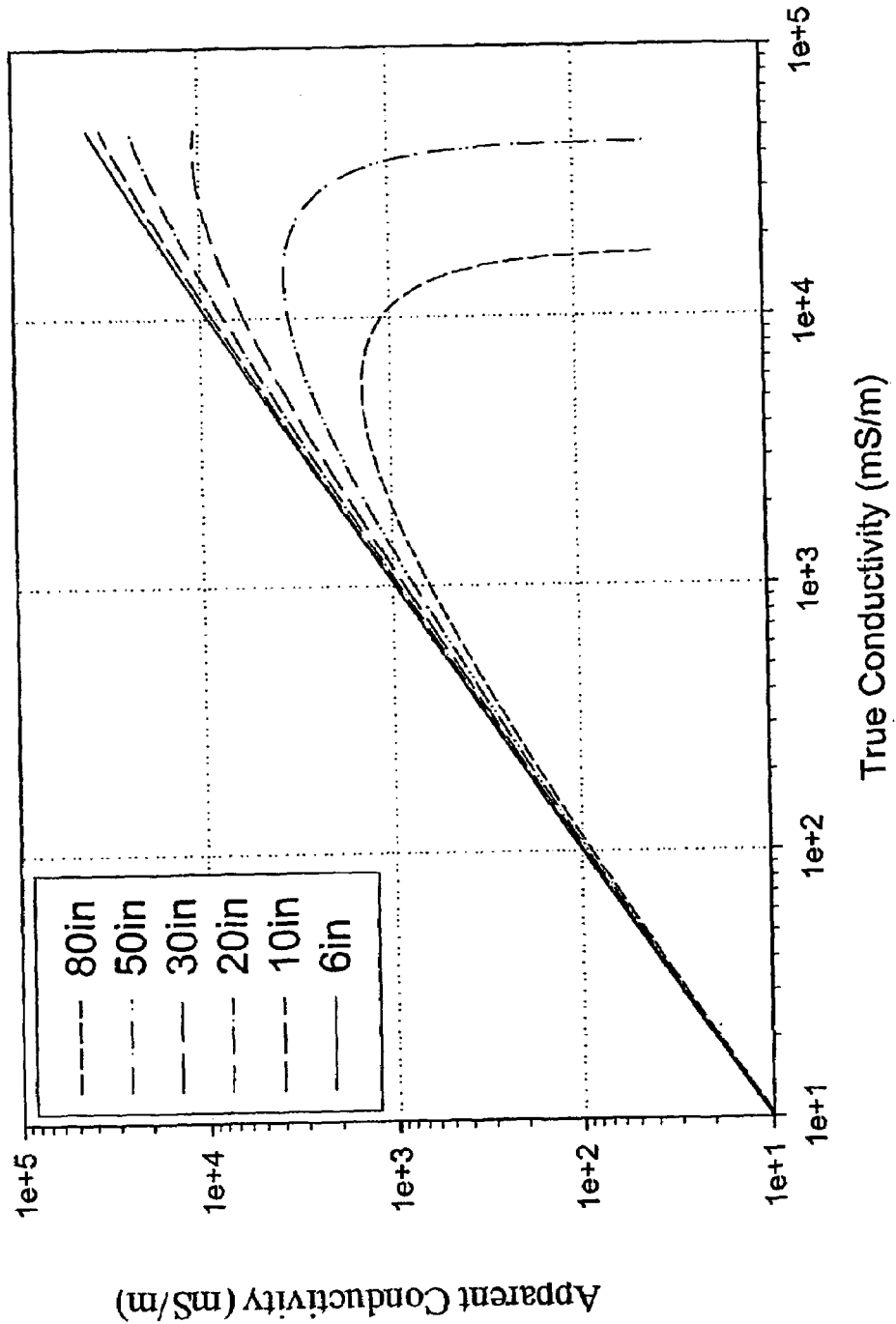
FIG. 4 illustrates responses at 12 kHz of six arrays in homogeneous formations that show how skin effect varies with transmitter-receiver coil spacing.

FIG. 4 depicts the responses at 12 kHz of six of the arrays in homogeneous formations that show skin effect varies with transmitter-receiver coil spacing.

Figure 5:
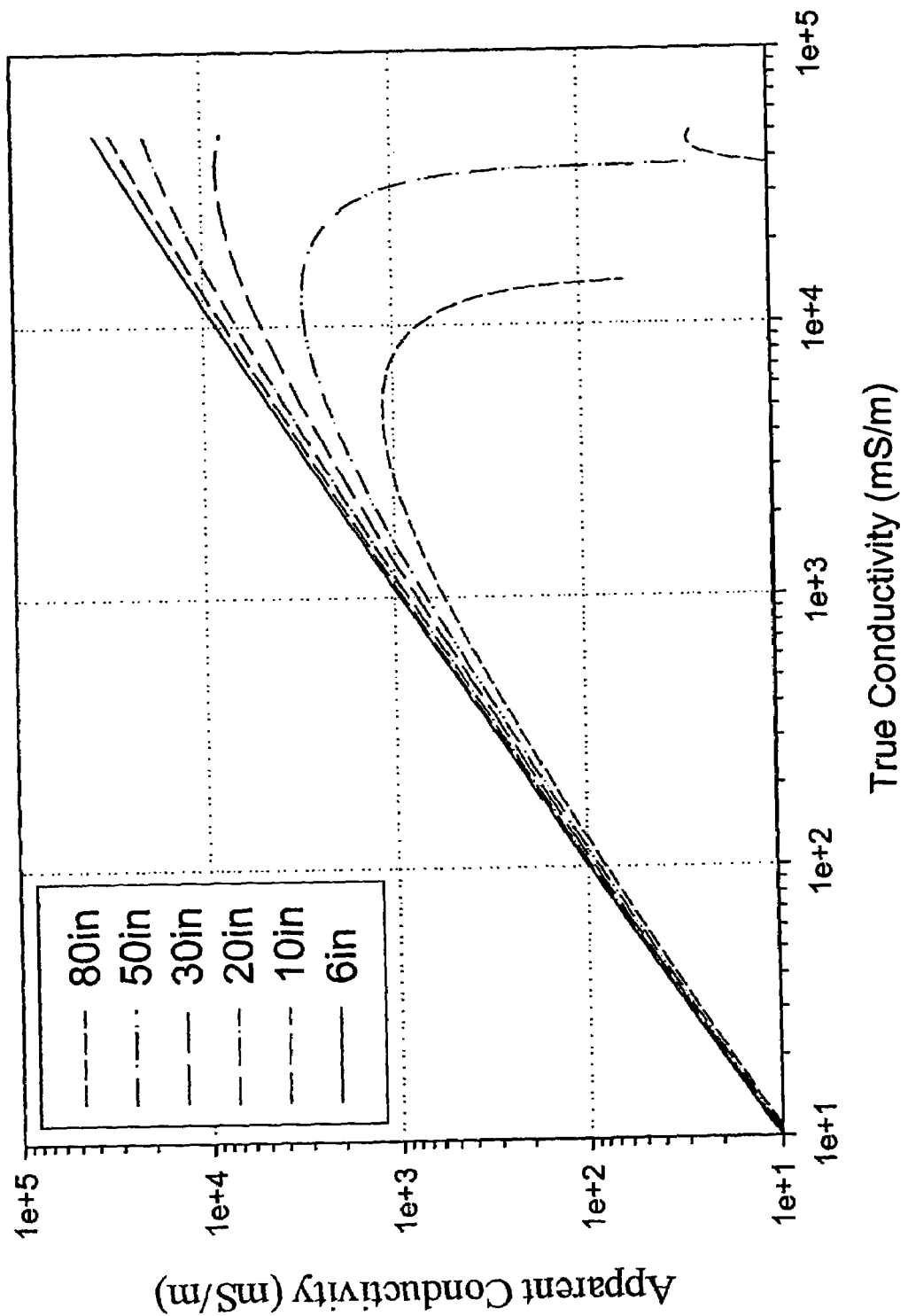
FIG. 5 illustrates the intermediate results of the skin effect correction after Equation (2A) is applied.

FIG. 5 depicts the intermediate results of the skin effect correction after Equation (2A) is applied. FIG. 5 shows that substantially no skin effect is removed by using Equation (2A).

Figure 6:
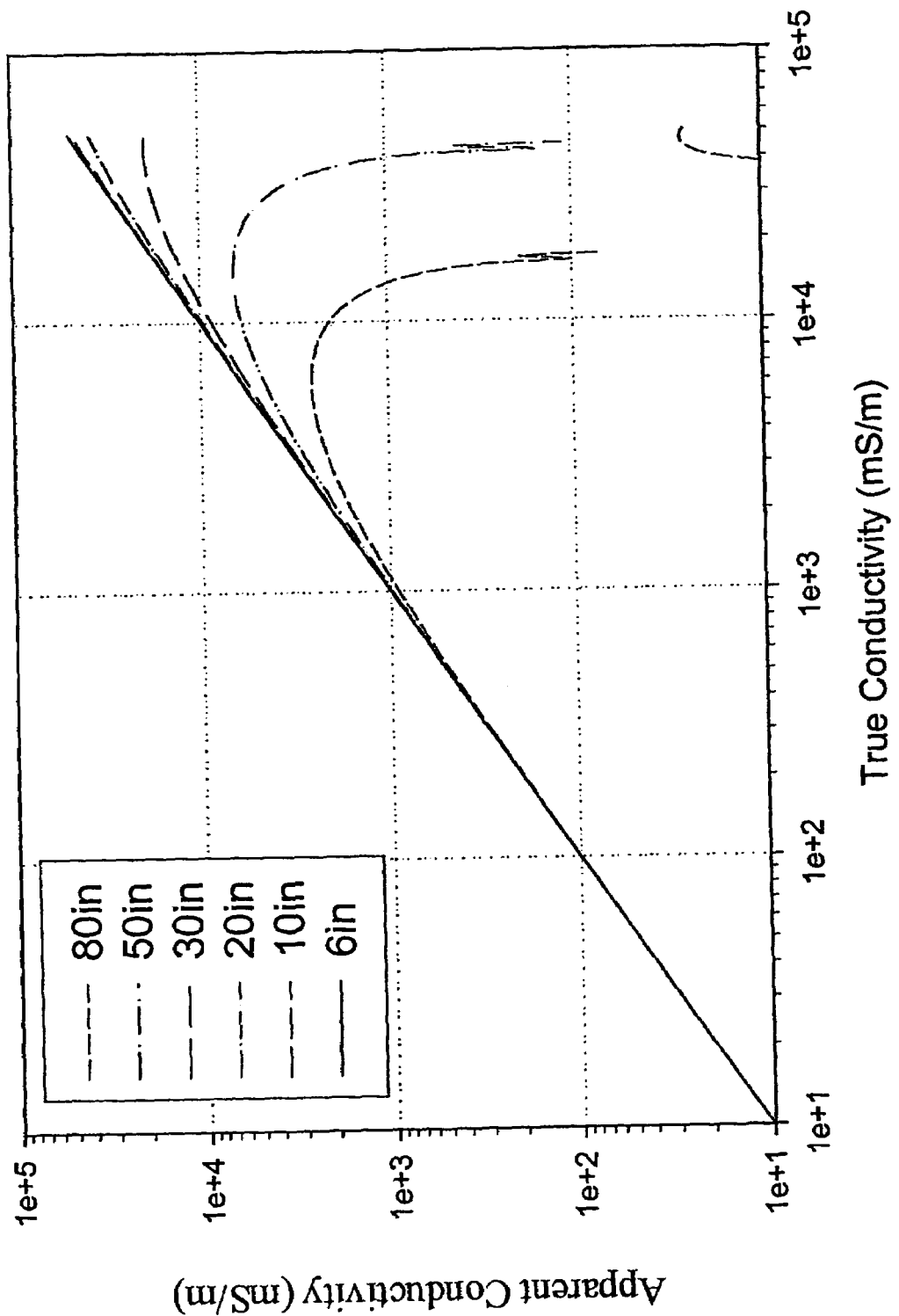
FIG. 6 illustrates the intermediate results of the skin effect correction after Equation (2B) is applied.

FIG. 6 depicts the intermediate results of the skin effect correction after Equation (2B) is applied. Comparing FIG. 6 with FIG. 5, the skin effect is corrected for low conductivity formations.

Figure 7:
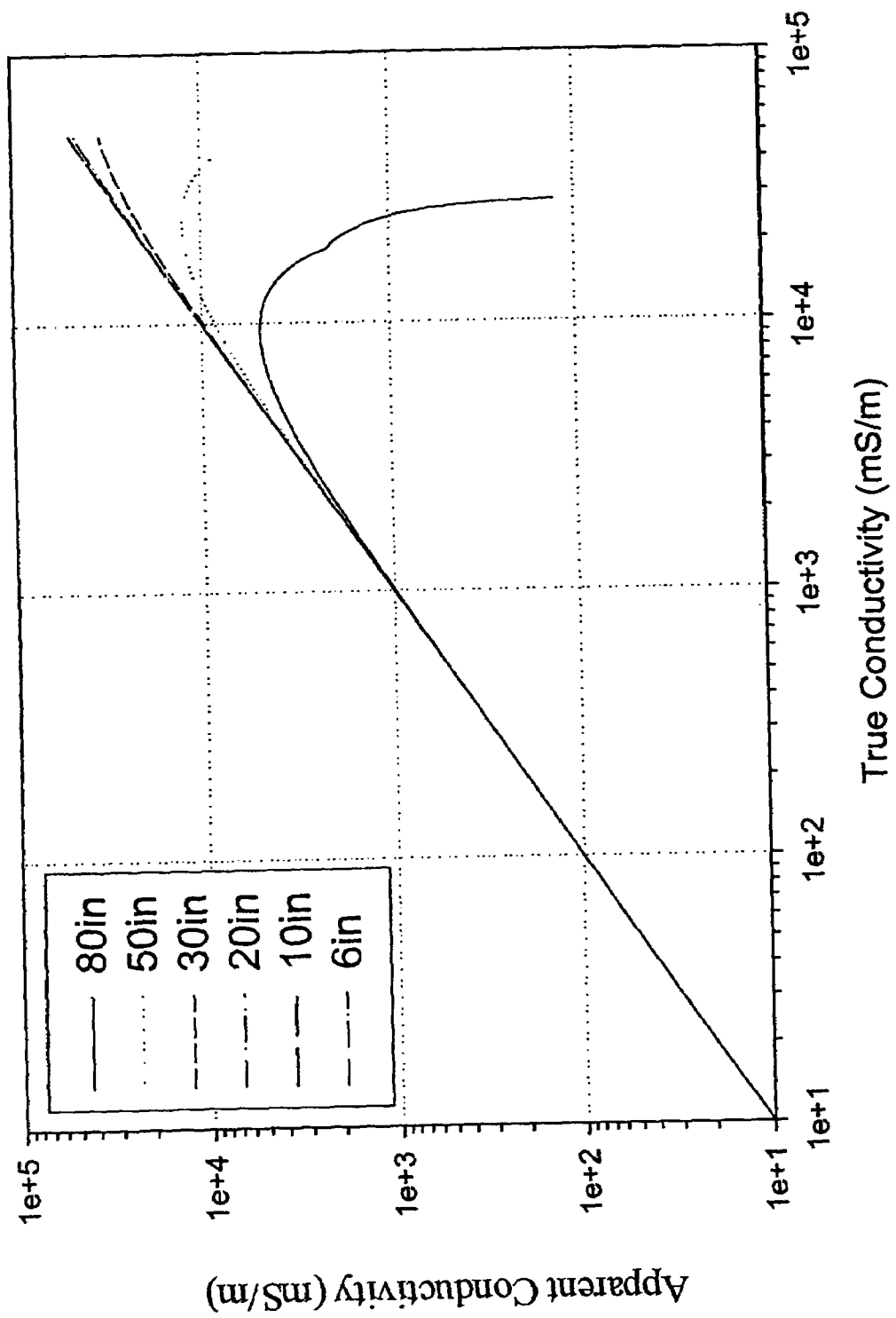
FIG. 7 illustrates the intermediate results of the skin effect correction after Equation (2C) is applied.

FIG. 7 depicts the intermediate results of the skin effect correction after Equation (2C) is applied. Comparing FIG. 7 with FIG. 6, the skin effect is corrected up to 1000 mS/m.

Figure 8:
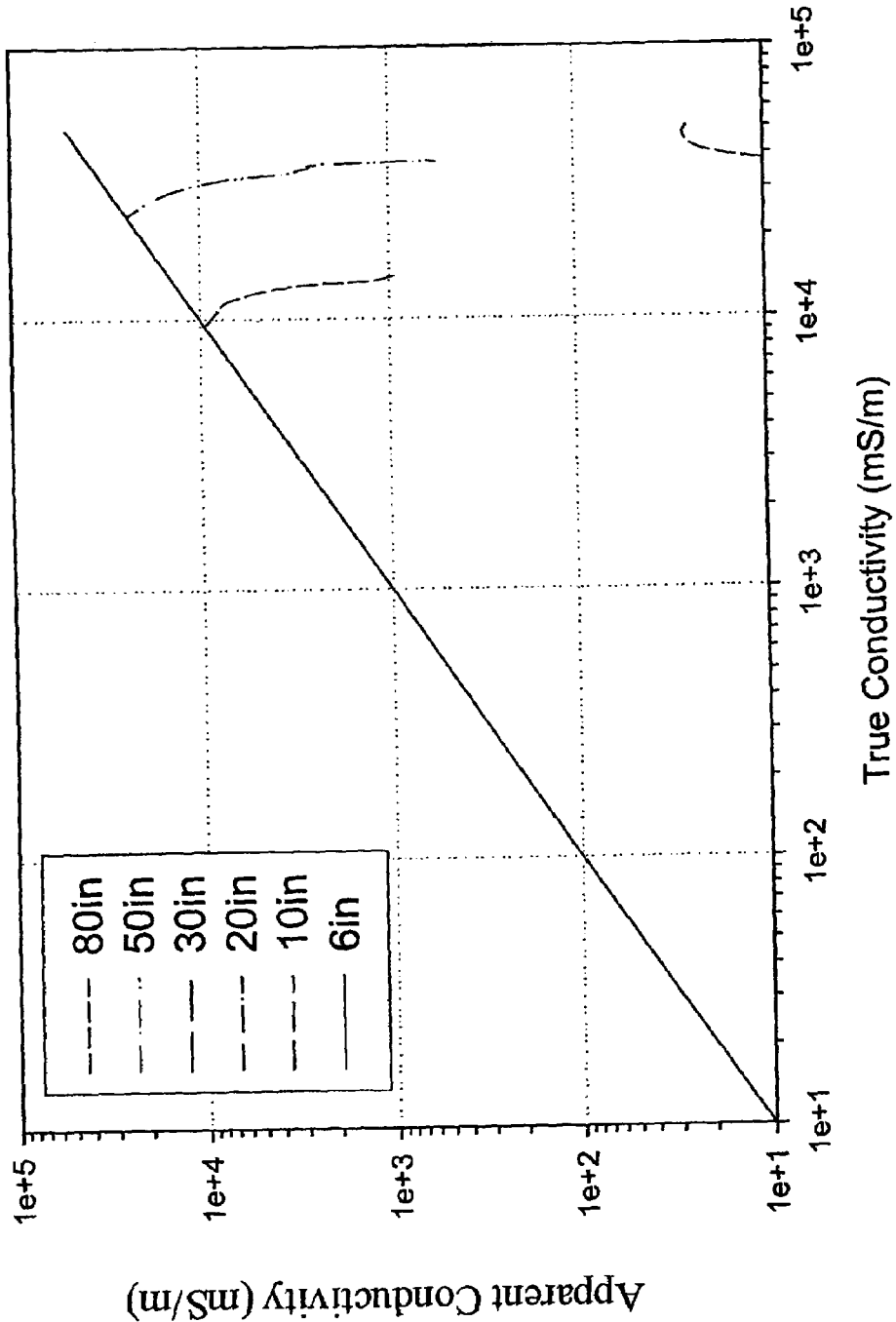
FIG. 8 illustrates the final results of the skin effect correction in homogeneous formations.

FIG. 8 depicts the final results of the skin effect correction in homogeneous formations. As shown in FIG. 8, the correction of the present invention may produce an incorrect result when the conductivity is above a certain value; e.g., 9,000 mS/m for the 80-inch array and 25,000 mS/m for the 50-inch array. Because this incorrect result occurs beyond the dynamic range of present technology induction well logging tools, it does not affect the practical application of the present invention.

The present invention corrects for skin effect in the conductivity value and at the same time for the geometric factors. Although the present invention corrects the generic 2D geometric factors for skin effect, only the vertical and radial geometric factors are shown for descriptive simplification.

Figure 9:
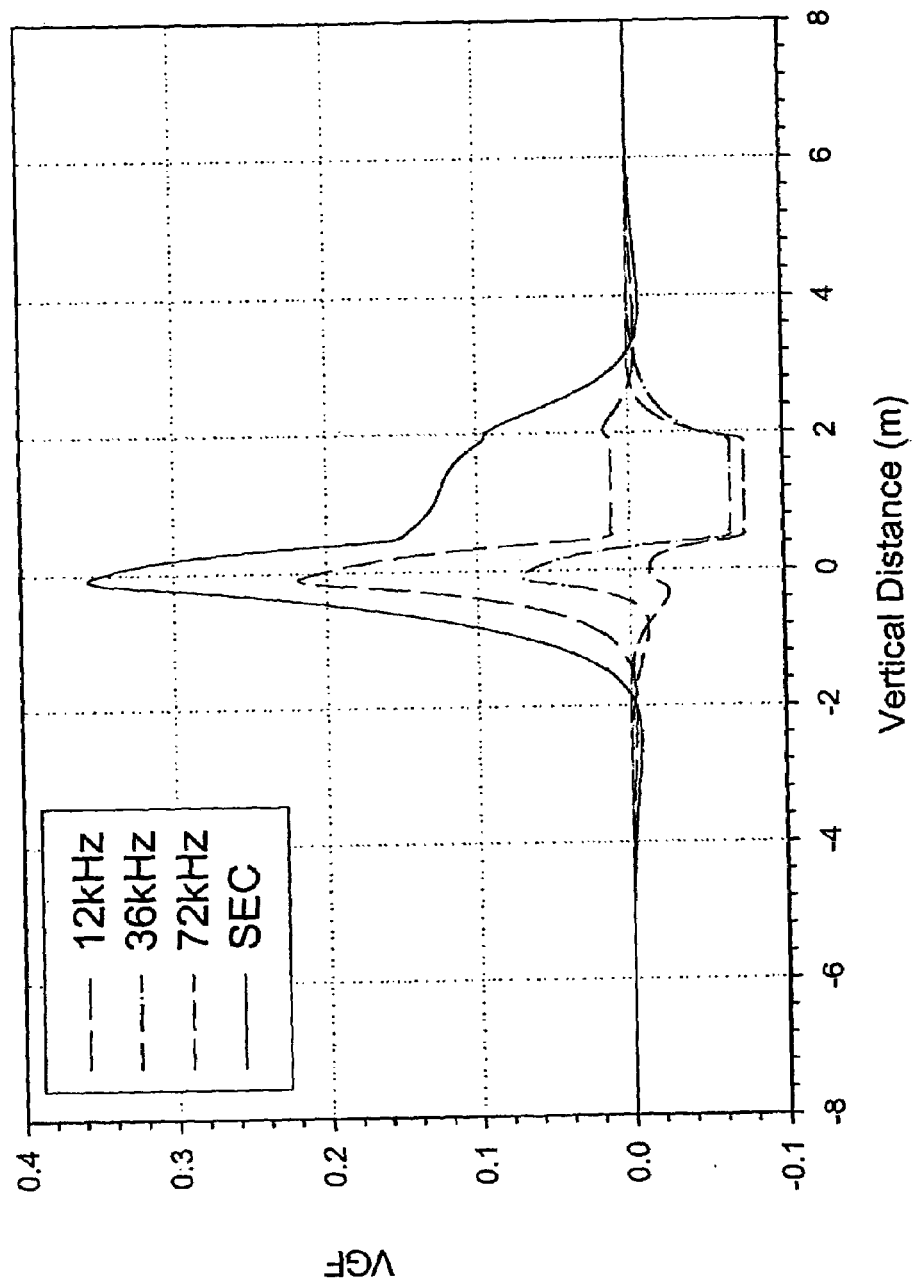
FIG. 9 illustrates the vertical geometric factors of an 80-inch array before and after the skin effect correction corrects the vertical geometric factor.

FIG. 9 depicts the vertical geometric factors of the 80-inch array before (graph lines 12 kHz, 36 kHz and 72 kHz) and after (graph line SEC) the skin effect correction. Where the vertical geometric factors (VGF) is shown on the vertical axis and the vertical distance (meters) is shown on the horizontal axis of the graph of FIG. 9.

Figure 10:
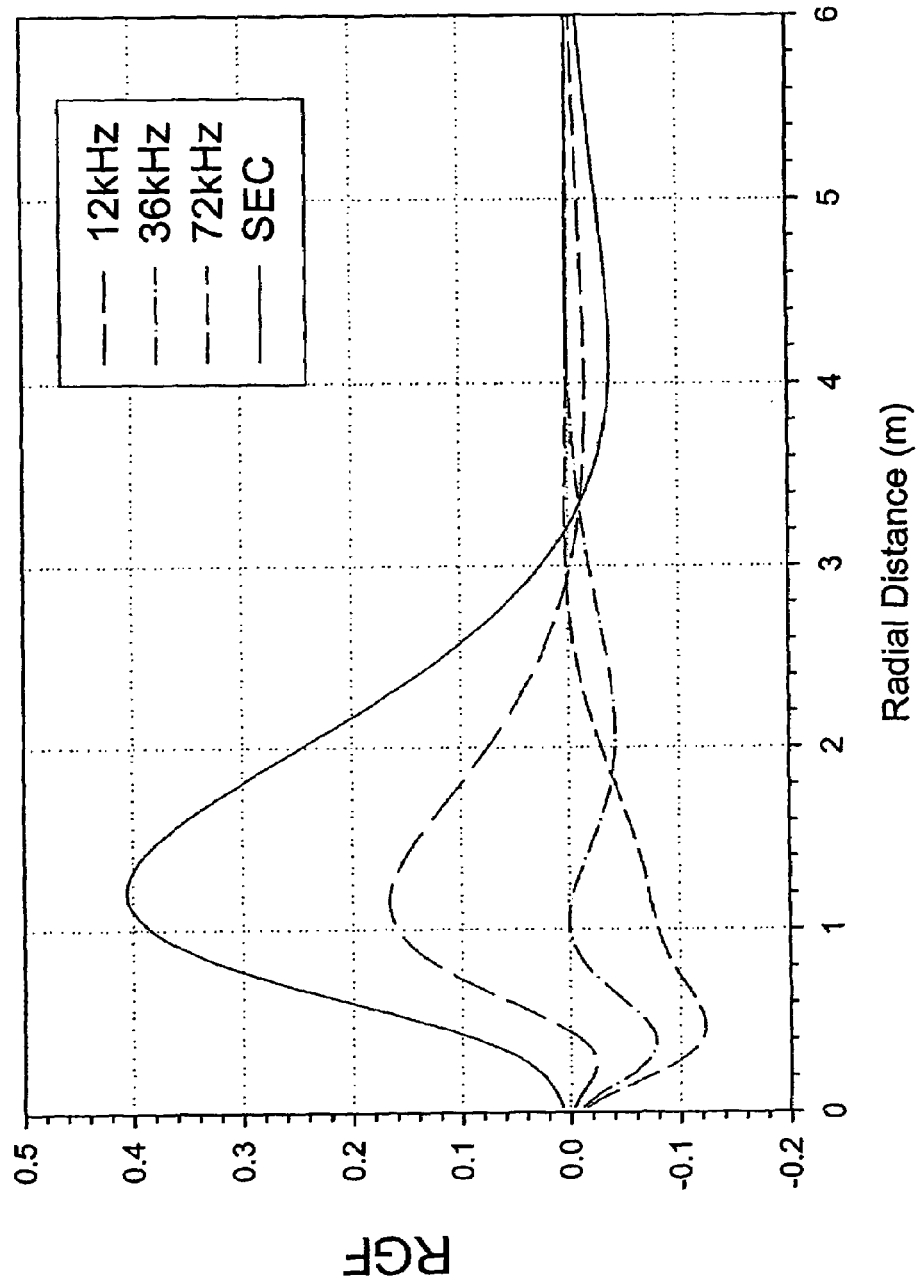
FIG. 10 illustrates the radial geometric factors of an 80-inch array before and after the skin effect correction corrections the radial geometric factor.

FIG. 10 depicts the radial geometric factors of the 80-inch array before (graph lines 12 kHz, 36 kHz and 72 kHz) and after (graph line SEC) the skin effect correction. Where the radial geometric factors (RGF) is shown on the vertical axis and the radial distance (meters) is shown on the horizontal axis of the graph of FIG. 10.

Figure 11:
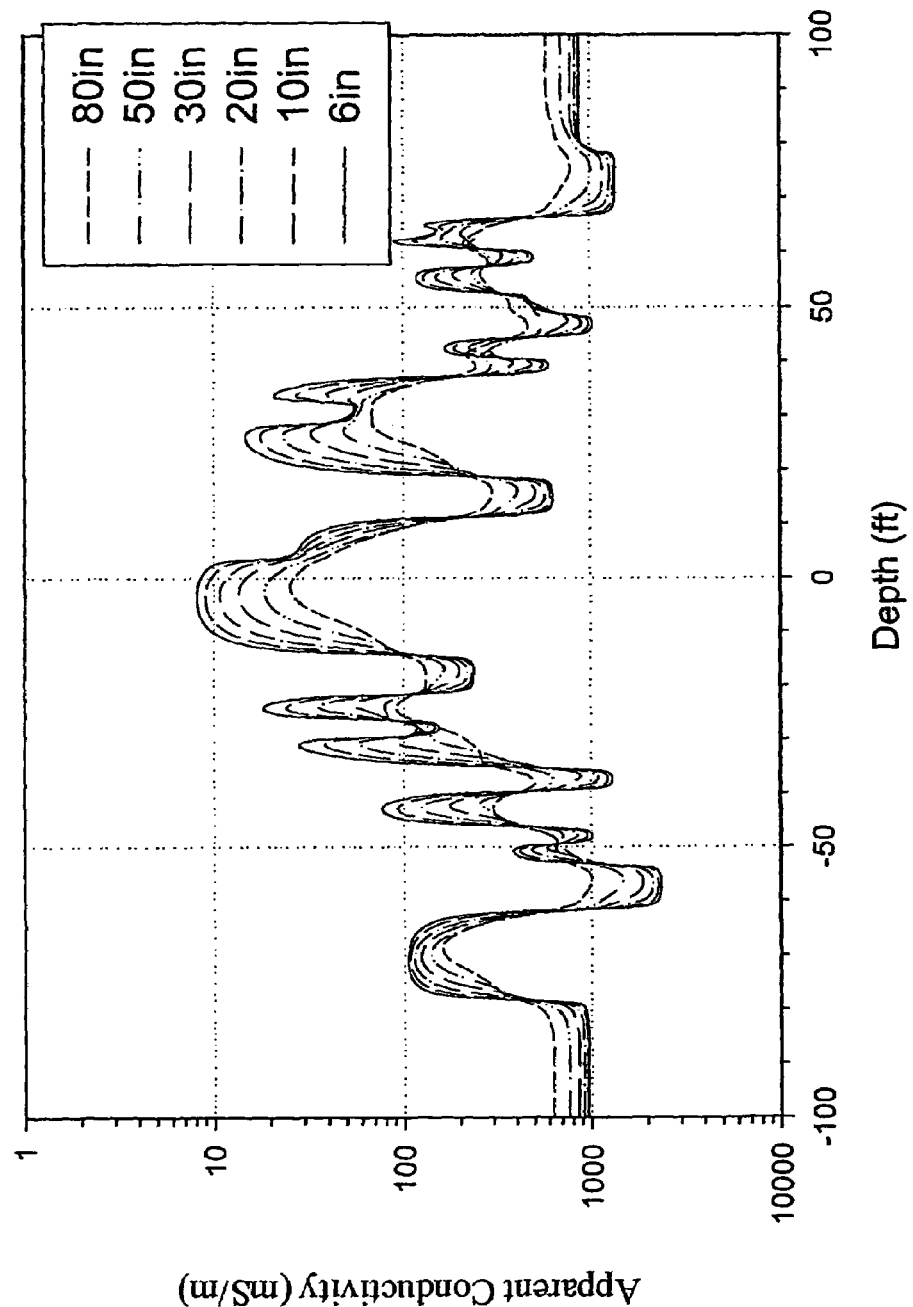
FIGS. 11, 12, and 13 show the modeled responses of the array induction tool at 12 kHz, 36 kHz and 72 kHz, respectively.
Figure 12:
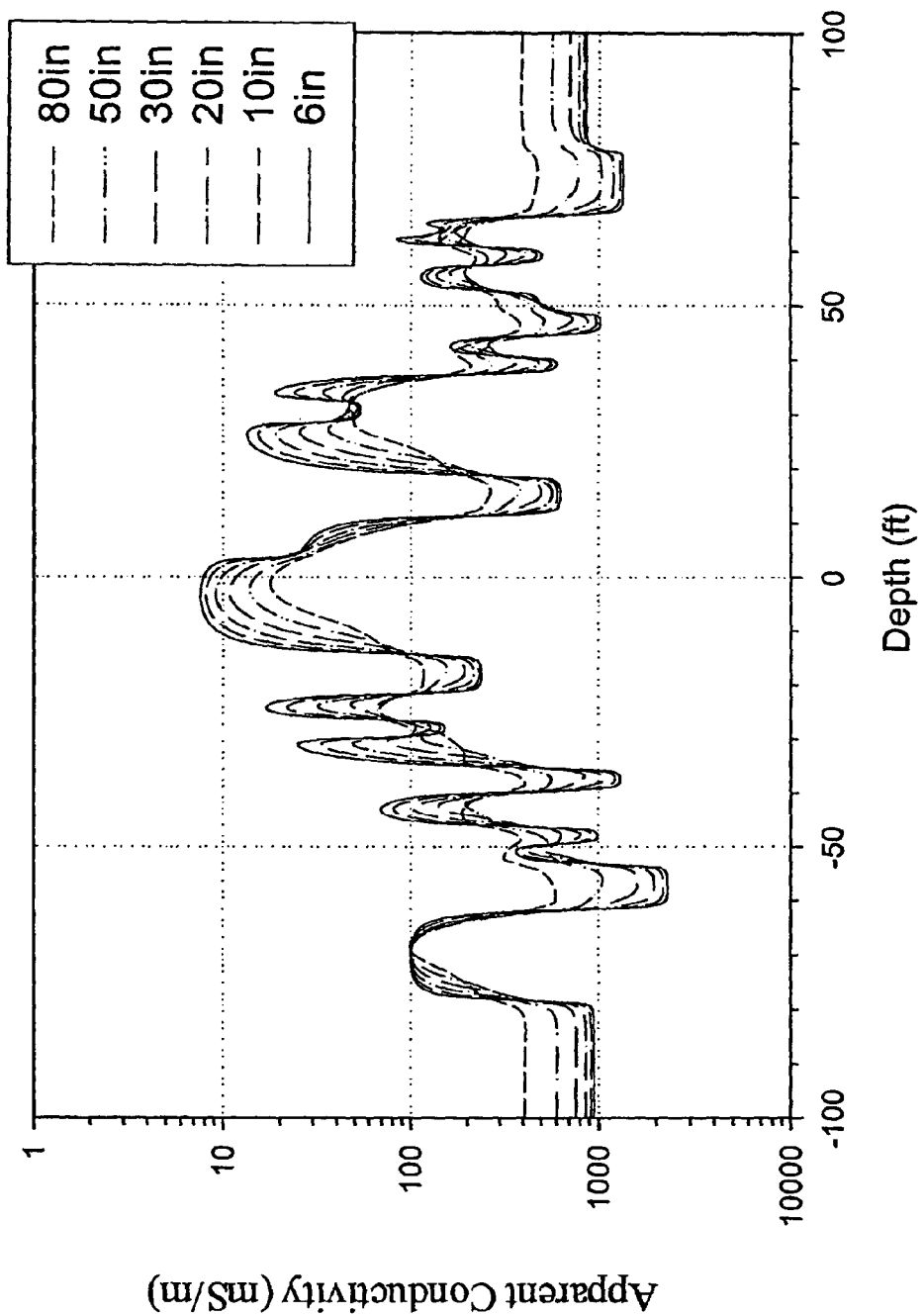
Figure 13:
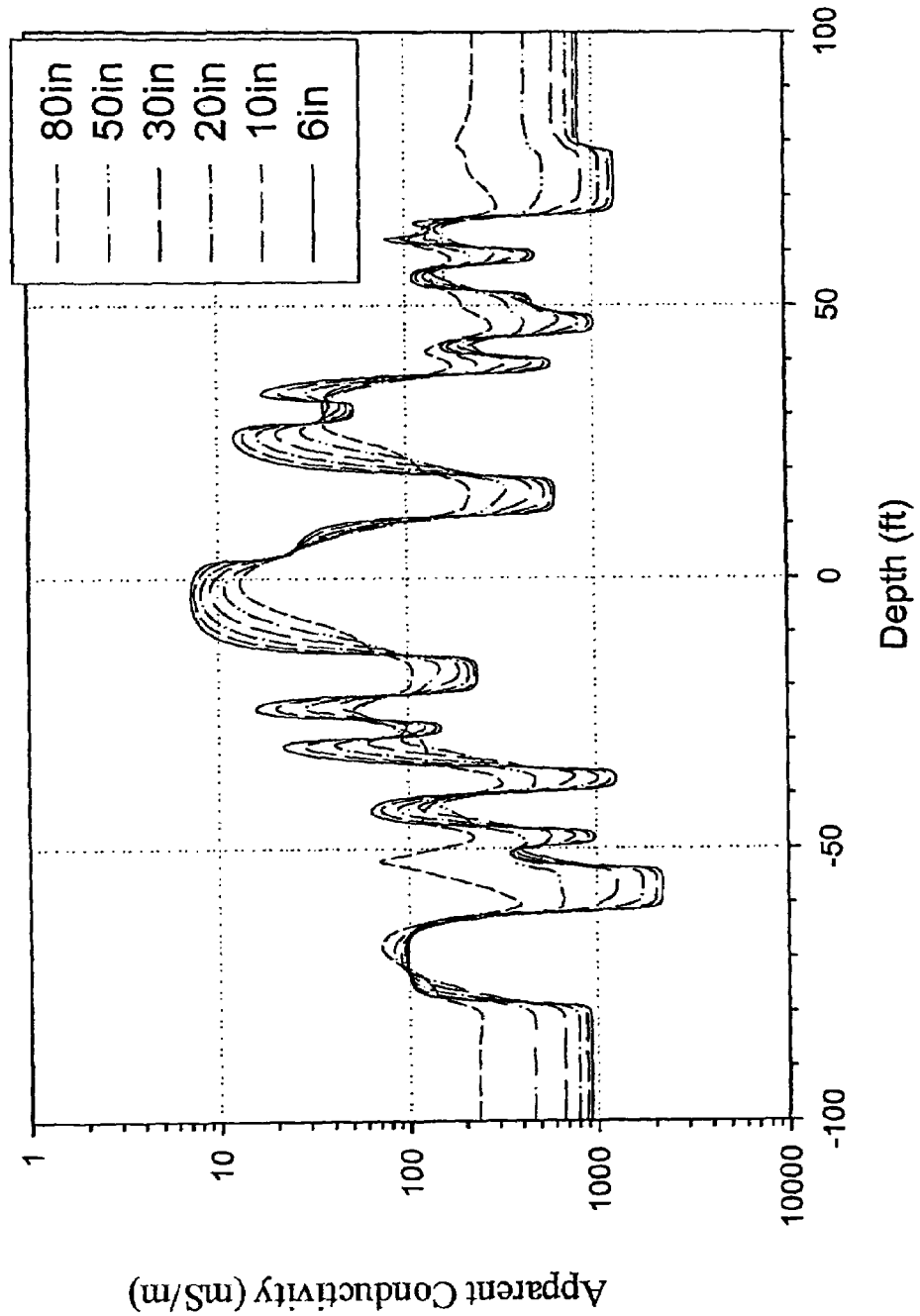
Figure 14:
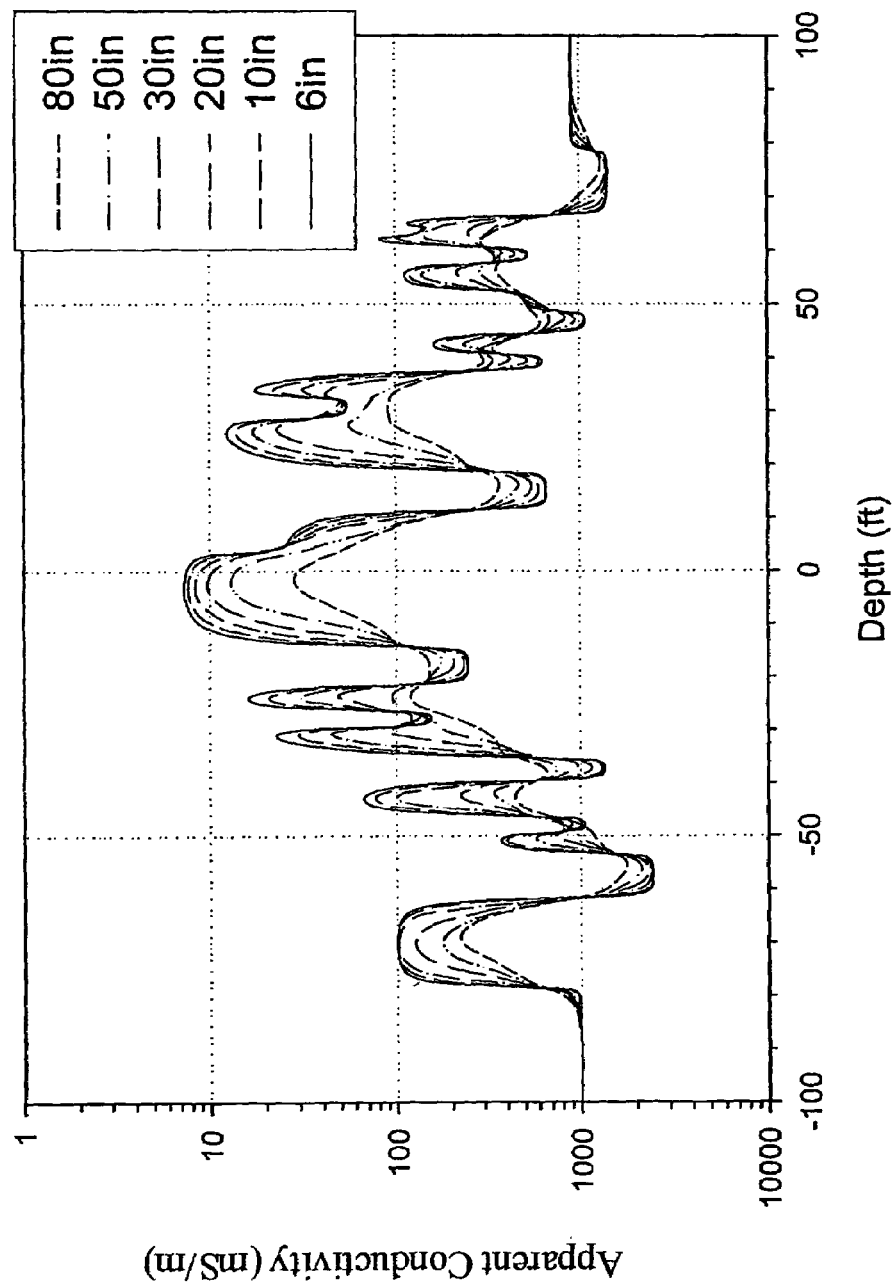
FIG. 14 illustrates the skin-effect corrected responses of an array induction tool, according to the present invention.

Utilizing, for example, numerical forward modeling, a set of synthetic data may be generated and used to test the present invention. FIGS. 11, 12, and 13 show the modeled responses of an array induction tool at 12 kHz, 36 kHz and 72 kHz, respectively. The skin-effect corrected result is shown in FIG. 14. Where the apparent conductivity (mS/m) is shown on the vertical axis and the depth (ft) is shown on the horizontal axis of the graphs of FIGS. 11–14.

Values from a look-up table are used to compensate for the residual skin effect in $\sigma_{sec0}$ and $\sigma_{sec1}$ that are obtained by Equations (6A) and (6B), or $\sigma_{sec0}$, $\sigma_{sec1}$ and $\sigma_{sec2}$ that are obtained by Equations (4A), (4B) and (4C). The look-up table values contain the dependencies of $\sigma_{sec0}$ and $\sigma_{s0}$, $\sigma_{sec1}$ and $\sigma_{s1}$, and $\sigma_{sec2}$ and $\sigma_{s2}$. The look-up table values cover the typical dynamic range of a induction tool, from about 0.0001 S/m through 100 S/m of formation conductivity, with discrete conductivity values, $\sigma_t^i$, i={1, ..., N}. That is, $\sigma_t^1$=0.0001 S/m and $\sigma_t^N$=100 S/m.

Figure 16:
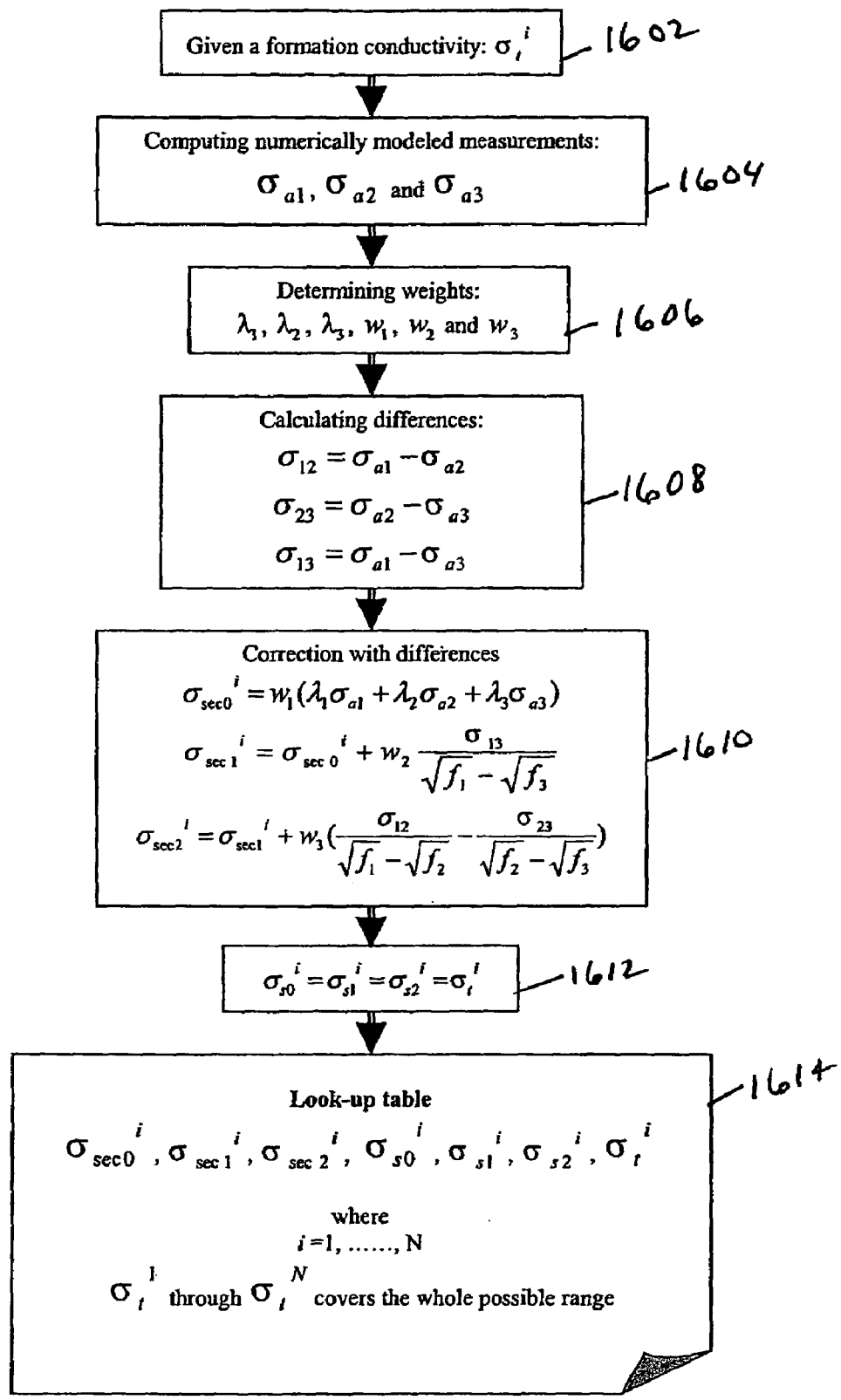
FIG. 16 illustrates a flowchart for creating a look-up table.

Referring now to FIG. 16, depicted is a flowchart for creating the $i^{th}$ row of the look-up table values that may be used with the present invention. In step 1602 a discrete formation conductivity value ($\sigma_t^i$) is selected. The measurements of a homogeneous formation of conductivity value ($\sigma_t^i$) are numerically computed in step 1604 for the first, second and third apparent conductivities ($\sigma_{a1}$, $\sigma_{a2}$ and $\sigma_{a3}$).

In step 1606, first, second and third weighting coefficients ($\lambda_1$, $\lambda_2$ and $\lambda_3$), and first, second and third weights ($w_1$, $w_2$ and $w_3$) are determined. Step 1608 determines the first conductivity difference, $\sigma_{12}$, between the measured first and second apparent conductivities ($\sigma_{a1}-\sigma_{a2}$), the second conductivity difference, $\sigma_{23}$, between the measured second and third apparent conductivities ($\sigma_{a2}-\sigma_{a3}$), and the third conductivity difference, $\sigma_{13}$, between the measured first and third apparent conductivities ($\sigma_{a1}-\sigma_{a3}$).

In step 1610, correction of the differences are performed, wherein a first corrected conductivity ($\sigma_{sec0}^i$) is determined, as indicated, from the measured first, second and third apparent conductivities ($\sigma_{a1}$, $\sigma_{a2}$ and $\sigma_{a3}$), the first, second and third weighting coefficients ($\lambda_1$, $\lambda_2$ and $\lambda_3$), and the first weight ($w_1$). Also in step 1610 a second corrected conductivity ($\sigma_{sec1}^i$) is determined, as indicated, from the first corrected conductivity ($\sigma_{sec0}^i$), the second weight ($w_2$), the third conductivity difference ($\sigma_{13}$), and the first and third operating frequencies ($f_1$ and $f_3$). Furthermore, in step 1610, a third corrected conductivity ($\sigma_{sec2}^i$) is determined, as indicated, from the second corrected conductivity ($\sigma_{sec1}^i$), the first conductivity difference ($\sigma_{12}$), the second conductivity difference ($\sigma_{23}$), the first, second and third operating frequencies ($f_1$, $f_2$ and $f_3$), and the third weight ($w_3$).

In step 1612, the compensated conductivites ($\sigma_{s0}^i$, $\sigma_{s1}^i$, $\sigma_{s2}^i$) are set to equal the formation conductivity value ($\sigma_t^i$). In step 1614, the $i^{th}$ row of the look-up table values are obtained when storing the first, second and third corrected conductivities ($\sigma_{sec0}^i$, $\sigma_{sec1}^i$, $\sigma_{sec2}^i$), the compensated conductivites ($\sigma_{s0}^i$, $\sigma_{s1}^i$, $\sigma_{s2}^i$) and the selected discrete formation conductivity value ($\sigma_t^i$). Performing the process depicted by FIG. 16 repeatedly from i=1 through i=N results in defining all of the required look-up table values.

Figure 17:
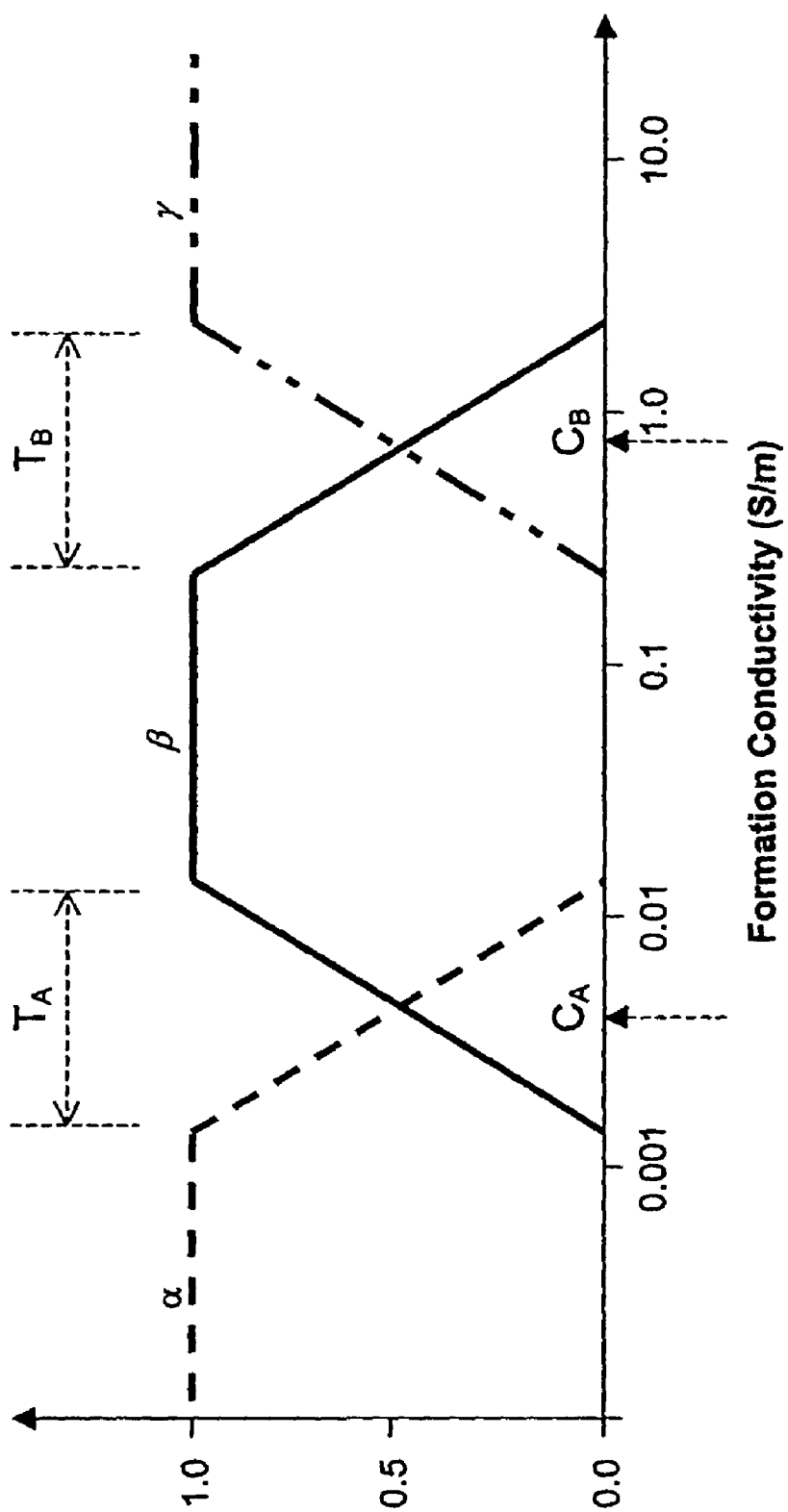
FIG. 17 illustrates a graph for determining selection coefficients.

FIG. 17 illustrates a graph for determining selection coefficients. Once the formation conductivity is estimated, the values of the selection coefficients may be determined by the turning points ($C_A$ and $C_B$) and transition widths ($T_A$ and $T_B$).

The invention, therefore, is well adapted to carry out the objects and attain the ends and advantages mentioned, as well as others inherent therein. While the invention has been depicted, described, and is defined by reference to exemplary embodiments of the invention, such a reference does not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A method for correcting skin effect in a induction logging system, said method comprising the steps of:
   measuring first, second and third apparent conductivities at first, second and third operating frequencies, respectively;
   determining first, second and third weighting coefficients;
   determining first, second and third weights;
   determining a first low-pass filtered conductivity difference between the measured first and second apparent conductivities;
   determining a second low-pass filtered conductivity difference between the measured second and third apparent conductivities;
   determining a third low-pass filtered conductivity difference between the measured first and third apparent conductivities;
   determining a first corrected conductivity from the measured first, second and third apparent conductivities, the first, second and third weighting coefficients, and the first weight;
   determining a second corrected conductivity from the first corrected conductivity, the second weight, the third low-pass filtered conductivity difference, and the first and third operating frequencies;
   determining a third corrected conductivity from the second corrected conductivity, the first low-pass filtered conductivity difference, the second low-pass filtered conductivity difference, the first, second and third operating frequencies, and the third weight;
   determining first, second and third compensated conductivities from the first, second and third corrected conductivities, respectively, and values from a look-up table;
   determining selection coefficients; and
   determining a formation corrected conductivity by summing the selection coefficients combined with the first, second and third compensated conductivities.

2. The method according to claim 1, wherein the sum of the selection coefficients equals one.

3. The method according to claim 1, wherein the step of determining the first low-pass filtered conductivity difference comprises the steps of subtracting the second apparent conductivity from the first apparent conductivity and low-pass filtering the difference.

4. The method according to claim 1, wherein the step of determining the second low-pass filtered conductivity difference comprises the steps of subtracting the third apparent conductivity from the second apparent conductivity and low-pass filtering the difference.

5. The method according to claim 1, wherein the step of determining the third low-pass filtered conductivity difference comprises the steps of subtracting the third apparent conductivity from the first apparent conductivity and low-pass filtering the difference.

6. The method according to claim 1, wherein the step of low-pass filtering controls random noise.

7. The method according to claim 1, wherein the step of low-pass filtering substantially matches response functions of the first and second conductivity differences to geometrical factors of the skin effect, wherein the first and second conductivity differences are substantially the apparent conductivity differences with respect to the square root of the operating frequencies.

8. The method according to claim 1, wherein the first weight is determined by:

$$w_1 = \frac{1}{\lambda_1 + \lambda_2 + \lambda_3}$$

where w1 is the first weight; and λ1, λ2 and λ3 are the first, second and third weighting coefficients, respectively.

9. The method according to claim 1, wherein the second weight is determined by:

$$w_2 = \frac{\lambda_1\sqrt{f_1} + \lambda_2\sqrt{f_2} + \lambda_2\sqrt{f_3}}{\lambda_1 + \lambda_2 + \lambda_3}$$

where $w_2$ is the second weight; $\lambda_1$, $\lambda_2$ and $\lambda_3$ are the first, second and third weighting coefficients, respectively; and $f_1$, $f_2$ and $f_3$ are the first, second and third operating frequencies, respectively.

10. The method according to claim 1, wherein the third weight is determined by:

$$w_3 = \frac{\sqrt{f_1}(\sqrt{f_1} + \sqrt{f_3})(\lambda_1\sqrt{f_3} + \lambda_2\sqrt{f_2} + \lambda_3\sqrt{f_3}) - \lambda_2\sqrt{f_2}(f_2 - f_3)}{(\lambda_1 + \lambda_2 + \lambda_3)(\sqrt{f_1} + \sqrt{f_2} + \sqrt{f_3})(\sqrt{f_1} - \sqrt{f_3})}$$

where $w_3$ is the third weight; $\lambda_1$, $\lambda_2$ and $\lambda_3$ are the first, second and third weighting coefficients, respectively; and $f_1$, $f_2$ and $f_3$ are the first, second and third operating frequencies, respectively.

11. The method according to claim 1, wherein the first corrected conductivity is determined by:

$$\sigma_{sec0} = w_1(\lambda_1\sigma_{a1} + \lambda_2\sigma_{a2} + \lambda_3\sigma_{a3})$$

where $\sigma_{sec0}$ is the first corrected conductivity; $w_1$ is the first weight; $\sigma_{a1}$, $\sigma_{a2}$ and $\sigma_{a3}$ are the measured first, second and third apparent conductivities, respectively; and $\lambda_1$, $\lambda_2$ and $\lambda_3$ are the first, second and third weighting coefficients, respectively.

12. The method according to claim 1, wherein the second corrected conductivity is determined by:

$$\sigma_{sec1} = \sigma_{sec0} + w_2\left(\frac{\sigma_{a1} - \sigma_{a3}}{\sqrt{f_1} - \sqrt{f_3}}\right) * h$$

where $\sigma_{sec1}$ is the second corrected conductivity; $\sigma_{sec0}$ is the first corrected conductivity; $w_2$ is the second weight; $\sigma_{a1}$ and $\sigma_{a3}$ are the measured first and third apparent conductivities, respectively; $f_1$ and $f_3$ are the first and third operating frequencies, respectively; and h is the low-pass filtering.

13. The method according to claim 1, wherein the third corrected conductivity is determined by:

$$\sigma_{sec2} = \sigma_{sec1} + w_3\left(\frac{\sigma_{a1} - \sigma_{a2}}{\sqrt{f_1} - \sqrt{f_2}} - \frac{\sigma_{a2} - \sigma_{a3}}{\sqrt{f_2} - \sqrt{f_3}}\right) * h$$

where $\sigma_{sec2}$ is the third corrected conductivity; $\sigma_{sec1}$ is the second corrected conductivity; $w_3$ is the third weight; $\sigma_{a1}$, $\sigma_{a2}$ and $\sigma_{a3}$ are the measured first, second and third apparent conductivities, respectively; $f_1$, $f_2$ and $f_3$ are the first, second and third operating frequencies, respectively; and h is the low-pass filtering.

14. The method according to claim 1, wherein the formation corrected conductivity is determined by: $\sigma_{sec} = \alpha\sigma_{s0} + \beta\sigma_{s1} + \gamma\sigma_{s2}$, where $\sigma_{sec}$ is the formation corrected conductivity; $\alpha\beta$ and $\gamma$ are the selection coefficients; and $\sigma_{s0}$, $\sigma_{s1}$ and $\sigma_{s2}$ are the first, second and third compensated conductivities, respectively.

15. The method according to claim 1, wherein the values of the look-up table are determined comprising the steps of:
 a) setting i=1
 b) selecting a discrete formation conductivity value ($\sigma_t^i$);
 c) computing the first, second and third apparent conductivities ($\sigma_{a1}$, $\sigma_{a2}$ and $\sigma_{a3}$);
 d) determining first, second and third weighting coefficients ($\lambda_1$, $\lambda_2$ and $\lambda_3$);
 e) determining first, second and third weights ($w_1$, $w_2$ and $w_3$);
 f) determining a first conductivity difference ($\sigma_{12}$) between the measured first and second apparent conductivities ($\sigma_{a1} - \sigma_{a2}$);
 g) determining a second conductivity difference ($\sigma_{23}$) between the measured second and third apparent conductivities ($\sigma_{a2} - \sigma_{a3}$);
 h) determining a third conductivity difference ($\sigma_{13}$) between the measured first and third apparent conductivities ($\sigma_{a1} - \sigma_{a3}$);
 i) determining a first corrected conductivity ($\sigma_{sec0}^i$) from the measured first, second and third apparent conductivities ($\sigma_{a1}$, $\sigma_{a2}$ and $\sigma_{a3}$), the first, second and third weighting coefficients ($\lambda_1$, $\lambda_2$ and $\lambda_3$) and the first weight ($w_1$);
 j) determining a second corrected conductivity ($\sigma_{sec1}^i$) from the first corrected conductivity ($\sigma_{sec0}^i$), the second weight ($w_2$), the third conductivity difference ($\sigma_{13}$), and the first and third operating frequencies ($f_1$ and $f_3$);
 k) determining a third corrected conductivity ($\sigma_{sec2}^i$) from the second corrected conductivity ($\sigma_{sec1}^i$), the first conductivity difference ($\sigma_{12}$), the second conductivity difference ($\sigma_{23}$), the first, second and third operating frequencies ($f_1$, $f_2$ and $f_3$), and the third weight ($w_3$);
 l) setting compensated conductivites ($\sigma_{s0}^i$, $\sigma_{s1}^i$, $\sigma_{s2}^i$) equal to a formation conductivity value;

m) storing the first, second and third corrected conductivities ($\sigma_{sec0}{}^i$, $\sigma_{sec1}{}^i$, $\sigma_{sec2}{}^i$), the compensated conductivities ($\sigma_{s0}{}^i$, $\sigma_{s1}{}^i$, $\sigma_{s2}{}^i$) and the selected discrete formation conductivity value ($\sigma_t{}^i$) in an $i^{th}$ row of the look-up table values; and n) incrementing i=i+1 and repeating steps b) through n) until i=N, whereby the look-up table values are defined by the discrete formation conductivity values ($\sigma_t{}^i$), where i is a positive integer value from 1 to N.

16. The method according to claim 1, wherein the step of determining selection coefficients comprises the steps of determining the selection coefficients by turning points ($C_A$ and $C_B$) and transition widths ($T_A$ and $T_B$) of a formation conductivity graph.

17. The method according to claim 1, wherein the first, second and third operating frequencies may be selected from about 5 kilohertz to about 500 kilohertz.

18. A method for correcting skin effect in a induction logging system, said method comprising the steps of:
  measuring first and second apparent conductivities at first and second operating frequencies, respectively;
  determining first and second weighting coefficients;
  determining first and second weights;
  determining a low-pass filtered conductivity difference between the measured first and second apparent conductivities;
  determining a first corrected conductivity from the measured first and second apparent conductivities, the first and second weighting coefficients, and the first weight;
  determining a second corrected conductivity from the first corrected conductivity, the second weight, the low-pass filtered conductivity difference, and the first and second operating frequencies;
  determining first and second compensated conductivities from the first and second corrected conductivities, respectively, and a look-up table;
  determining selection coefficients; and
  determining a formation corrected conductivity by summing the selection coefficients combined with the first and second compensated conductivities.

19. The method according to claim 18, wherein the sum of the selection coefficients equals one.

20. The method according to claim 18, wherein the step of determining the first low-pass filtered conductivity difference comprises the steps of subtracting the second apparent conductivity from the first apparent conductivity and low-pass filtering the difference.

21. The method according to claim 18, wherein the step of low-pass filtering controls random noise.

22. The method according to claim 18, wherein the step of low-pass filtering substantially matches geometric factors of formation skin effect in relation to the square root of the operating frequencies.

23. The method according to claim 18, wherein the first weight is determined by:

$$w_1 = \frac{1}{\lambda_1 + \lambda_2}$$

where $w_1$ is the first weight; and $\lambda_1$ and $\lambda_2$ are the first and second weighting coefficients, respectively.

24. The method according to claim 18, wherein the second weight is determined by:

$$w_2 = \frac{\lambda_1 \sqrt{f_1} + \lambda_2 \sqrt{f_2}}{\lambda_1 + \lambda_2}$$

where $w_2$ is the second weight; $\lambda_1$ and $\lambda_2$ are the first and second weighting coefficients, respectively; and $f_1$ and $f_{2\ 3}$ are the first and second operating frequencies, respectively.

25. The method according to claim 18, wherein the first corrected conductivity is determined by: $\sigma_{sec0} = w_1 (\lambda_1 \sigma_{a1} + \lambda_2 \sigma_{a2})$ where $\sigma_{sec0}$ is the first corrected conductivity; $w_1$ is the first weight; $\sigma_{a1}$ and $\sigma_{a2}$ are the measured first and second apparent conductivities, respectively; and $\lambda_1$ and $\lambda_2$ are the first and second weighting coefficients, respectively.

26. The method according to claim 18, wherein the second corrected conductivity is determined by:

$$\sigma_{sec1} = \sigma_{sec0} + w_2 \left( \frac{\sigma_{a1} - \sigma_{a2}}{\sqrt{f_1} - \sqrt{f_2}} \right) * h$$

where $\sigma_{sec1}$ is the second corrected conductivity; $\sigma_{sec0}$ is the first corrected conductivity; $w_2$ is the second weight; $\sigma_{a1}$ and $\sigma_{a2}$ are the measured first and second apparent conductivities, respectively; $f_1$ and $f_2$ are the first and second operating frequencies, respectively; and h is the low-pass filtering.

27. The method according to claim 18, wherein the formation corrected conductivity is determined by: $\sigma_{sec} = \alpha \sigma_{s0} + \beta \sigma_{s1}$, where $\sigma_{sec}$ is the formation corrected conductivity; $\alpha$ and $\beta$ are are the selection coefficients; and $\sigma_{s0}$ and $\sigma_{s1}$ are the first and second compensated conductivities, respectively.

28. The method according to claim 18, wherein the first and second operating frequencies may be selected from about 5 kilohertz to about 500 kilohertz.

29. A method for correcting skin effect in a induction logging system, said method comprising the steps of:
  measuring two or more apparent conductivities at two or more operating frequencies;
  determining weighting coefficients;
  determining weights;
  determining a low-pass filtered conductivity difference between the two or more apparent conductivities;
  determining a first corrected conductivity from the measured two or more apparent conductivities, the weighting coefficients, and the weights;
  determining a second corrected conductivity from the first corrected conductivity, the weights, the low-pass filtered conductivity difference, and the two or more operating frequencies;
  determining first and second compensated conductivities from the first and second corrected conductivities, respectively, and a look-up table;
  determining selection coefficients;
  combining the selection coefficients with the first and second compensated conductivities; and
  summing the combined selection coefficients and the first and second compensated conductivities to obtain a formation corrected conductivity.

30. The method according to claim 29, wherein the sum of the selection coefficients equals one.

31. The method according to claim 29, wherein the step of determining the low-pass filtered conductivity difference comprises the steps of subtracting one of the two or more apparent conductivities from the other two or more apparent conductivities and low-pass filtering the difference.

32. The method according to claim 29, wherein the step of low-pass filtering controls random noise.

33. The method according to claim 29, wherein the step of low-pass filtering substantially matches geometric factors of formation skin effect in relation to the square root of the operating frequencies.

34. The method according to claim 29, wherein the operating frequencies may be selected from about 5 kilohertz to about 500 kilohertz.

35. A method for correcting skin effect in a induction logging system, said method comprising the steps of:
- measuring at least two apparent conductivities at two or more operating frequencies;
- determining weighting coefficients;
- determining weights;
- determining a low-pass filtered conductivity difference between the at least two apparent conductivities;
- determining at least two corrected conductivities from the measured at least two apparent conductivities, the weighting coefficients, the weights, the low-pass filtered conductivity difference and the two or more operating frequencies;
- determining at least two compensated conductivities from the at least two corrected conductivities and a look-up table;
- determining selection coefficients; and
- determining a formation corrected conductivity from the at least two compensated conductivities and the selection coefficients.

36. The method according to claim 35, wherein the operating frequencies may be selected from about 5 kilohertz to about 500 kilohertz.

37. An induction logging system having skin effect correction, said system comprising:
- an induction logging tool for measuring first, second and third apparent conductivities at first, second and third operating frequencies, respectively;
- a processor, wherein:
- the processor receives the measured first, second and third apparent conductivities from the induction logging tool;
- the processor determines first, second and third weighting coefficients;
- the processor determines first, second and third weights;
- the processor determines a first low-pass filtered conductivity difference between the measured first and second apparent conductivities;
- the processor determines a second low-pass filtered conductivity difference between the measured second and third apparent conductivities;
- the processor determines a third low-pass filtered conductivity difference between the measured first and third apparent conductivities;
- the processor determines a first corrected conductivity from the measured first, second and third apparent conductivities, the first, second and third weighting coefficients, and the first weight;
- the processor determines a second corrected conductivity from the first corrected conductivity, the second weight, the third low-pass filtered conductivity difference, and the first and third operating frequencies;
- the processor determines a third corrected conductivity from the second corrected conductivity, the first low-pass filtered conductivity difference, the second low-pass filtered conductivity difference, the first, second and third operating frequencies, and the third weight;
- the processor determines first, second and third compensated conductivities from the first, second and third corrected conductivities, respectively, and values from a look-up table;
- the processor determines selection coefficients; and
- the processor determines a formation corrected conductivity by summing the selection coefficients combined with the first, second and third compensated conductivities.

38. The system according to claim 37, further comprising a display system for displaying the formation corrected conductivity.

39. The system according to claim 37, further comprising a control system for communicating with the logging tool and providing parameters thereto.

40. The system according to claim 39, wherein the parameters are the first, second and third operating frequencies.

41. The system according to claim 37, wherein the induction logging tool comprises at least one pair of transmitting and receiving electromagnetic induction coils separated by a distance.

42. The system according to claim 41, wherein the distance between the at least one pair of transmitting and receiving electromagnetic induction coils may be from about 5 inches to about 150 inches.

43. The system according to claim 41, wherein the at least one pair of transmitting and receiving electromagnetic induction coils comprises a plurality of transmitting and receiving electromagnetic induction coil pairs separated in various distances from about 5 inches to about 150 inches.

44. The system according to claim 37, wherein the processor is a computer controlled by a software program.

45. The system according to claim 37, wherein the processor is in the induction logging tool.

46. The system according to claim 39, wherein the processor is in the control system.

47. An induction logging system having skin effect correction, said system comprising:
- an induction logging tool for measuring at least two apparent conductivities at two or more operating frequencies;
- a processor, wherein:
- the processor receives the measured at least two apparent conductivities from the induction logging tool;
- the processor determines weighting coefficients;
- the processor determines weights;
- the processor determines a low-pass filtered conductivity difference between at least two apparent conductivities;
- the processor determines at least two corrected conductivity from the measured at least two apparent conductivities, the weighting coefficients, the weights, the low-pass filtered conductivity difference and the two or more operating frequencies;
- the processor determines at least two compensated conductivities from the at least two corrected conductivities and a look-up table;
- the processor determines selection coefficients; and
- the processor determines a formation corrected conductivity from the at least two compensated conductivities and the selection coefficients.

48. The system according to claim 47, wherein the induction logging tool comprises at least one pair of transmitting and receiving electromagnetic induction coils separated by a distance.

49. The system according to claim 48, wherein the distance between the at least one pair of transmitting and receiving electromagnetic induction coils may be from about 5 inches to about 150 inches.

50. The system according to claim 48, wherein the at least one pair of transmitting and receiving electromagnetic induction coils comprises a plurality of transmitting and receiving electromagnetic induction coil pairs separated in various distances from about 5 inches to about 150 inches.

* * * * *